United States Patent
Ando

(10) Patent No.: US 11,909,847 B2
(45) Date of Patent: *Feb. 20, 2024

(54) INFORMATION PROCESSING APPARATUS, INFORMATION PROCESSING SYSTEM, INFORMATION PROCESSING METHOD AND RECORDING MEDIUM

(71) Applicant: Ricoh Company, Ltd., Tokyo (JP)

(72) Inventor: Mitsuo Ando, Fukuoka (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/099,260

(22) Filed: Jan. 20, 2023

(65) Prior Publication Data

US 2023/0156099 A1 May 18, 2023

Related U.S. Application Data

(63) Continuation of application No. 17/237,270, filed on Apr. 22, 2021, now Pat. No. 11,588,919, which is a (Continued)

(30) Foreign Application Priority Data

Sep. 12, 2018 (JP) ................................. 2018-170602

(51) Int. Cl.
*H04L 67/60* (2022.01)
*G06F 3/14* (2006.01)
(Continued)

(52) U.S. Cl.
CPC ................ *H04L 67/60* (2022.05); *G06F 3/14* (2013.01); *H04L 67/01* (2022.05);
(Continued)

(58) Field of Classification Search
None
See application file for complete search history.

(56) References Cited

U.S. PATENT DOCUMENTS

| | | | |
|---|---|---|---|
| 6,728,758 B2 * | 4/2004 | Sato | G06F 16/2471 370/349 |
| 8,934,124 B2 * | 1/2015 | Ishibashi | H04N 1/2175 358/1.9 |

(Continued)

FOREIGN PATENT DOCUMENTS

| | | |
|---|---|---|
| CN | 1818871 A | 8/2006 |
| CN | 1931410 A | 3/2007 |

(Continued)

OTHER PUBLICATIONS

Japanese Office Action dated Mar. 22, 2023, in corresponding Japanese Patent Application No. 2022-023055, 5pp.

(Continued)

*Primary Examiner* — Lashonda Jacobs-Burton
(74) *Attorney, Agent, or Firm* — XSENSUS LLP

(57) ABSTRACT

An information processing apparatus communicably connected with an intermediary device capable of communicating with at least one device, the information processing apparatus including: circuitry configured to receive, from a terminal operated by a user, identification information that the terminal has acquired from the extraneous source; and transmit a request for execution of a process associated with the acquired identification information to the intermediary device, the request for execution causing the intermediary device to execute the process according to the request for execution to control the device.

18 Claims, 19 Drawing Sheets

Related U.S. Application Data continuation of application No. 16/550,360, filed on Aug. 26, 2019, now Pat. No. 11,019,176.

(51) Int. Cl.

| | | |
|---|---|---|
| *H04N 1/00* | (2006.01) | |
| *H04L 67/01* | (2022.01) | |
| *H04W 4/80* | (2018.01) | |
| *G06F 9/50* | (2006.01) | |
| *H04L 67/10* | (2022.01) | |
| *H04N 1/21* | (2006.01) | |

(52) U.S. Cl.
CPC ..... *H04N 1/00185* (2013.01); *H04N 1/00474* (2013.01); *G06F 9/5005* (2013.01); *G06F 2209/5015* (2013.01); *H04L 67/10* (2013.01); *H04N 1/00137* (2013.01); *H04N 1/2166* (2013.01); *H04N 2201/0094* (2013.01); *H04W 4/80* (2018.02)

(56) References Cited

U.S. PATENT DOCUMENTS

| | | | |
|---|---|---|---|
| 9,232,395 B2 | 1/2016 | Matsuda | |
| 9,756,202 B2* | 9/2017 | Ando | H04L 67/12 |
| 10,701,221 B2* | 6/2020 | Araki | G06F 3/1204 |
| 10,855,857 B2* | 12/2020 | Ando | H04N 1/00185 |
| 2004/0025056 A1 | 2/2004 | Katsube | |
| 2005/0044179 A1* | 2/2005 | Hunter | G06F 16/9554 |
| | | | 709/218 |
| 2005/0270569 A1 | 12/2005 | Hayashi | |
| 2006/0077119 A1* | 4/2006 | Zhang | H04L 67/02 |
| | | | 345/2.1 |
| 2011/0066671 A1* | 3/2011 | Motohashi | G03B 21/006 |
| | | | 709/201 |
| 2011/0085196 A1* | 4/2011 | Liu | G06F 3/1204 |
| | | | 358/1.15 |
| 2012/0008161 A1* | 1/2012 | Rouhana | H04W 4/80 |
| | | | 358/1.15 |
| 2012/0086559 A1 | 4/2012 | Trappeniers et al. | |
| 2013/0051692 A1* | 2/2013 | Kakutani | H04N 1/32133 |
| | | | 382/233 |
| 2013/0073719 A1 | 3/2013 | Ando | |
| 2013/0114386 A1* | 5/2013 | Sato | G11B 20/00855 |
| | | | 369/47.12 |
| 2013/0215467 A1* | 8/2013 | Fein | G06F 3/1204 |
| | | | 358/1.15 |
| 2014/0071482 A1* | 3/2014 | Ishibashi | H04N 1/2175 |
| | | | 358/1.15 |
| 2014/0096202 A1 | 4/2014 | Matsuda | |
| 2014/0333948 A1* | 11/2014 | Hashimoto | H04N 1/00278 |
| | | | 358/1.13 |
| 2014/0344420 A1* | 11/2014 | Rjeili | G06Q 10/109 |
| | | | 709/227 |
| 2015/0070725 A1* | 3/2015 | Monden | G06F 3/1292 |
| | | | 358/1.15 |
| 2015/0082389 A1* | 3/2015 | Han | H04L 63/205 |
| | | | 726/4 |
| 2016/0274766 A1 | 9/2016 | Song | |
| 2016/0342577 A1 | 11/2016 | Ando | |
| 2017/0085572 A1* | 3/2017 | Miyakawa | H04L 63/10 |
| 2017/0102865 A1 | 4/2017 | Ando | |
| 2017/0192723 A1* | 7/2017 | Ichikawa | H04W 12/50 |
| 2017/0257683 A1* | 9/2017 | Yamada | G08C 17/00 |
| 2017/0272601 A1 | 9/2017 | Ando | |
| 2017/0339232 A1* | 11/2017 | Ando | H04N 1/00204 |
| 2018/0084121 A1 | 3/2018 | Ando | |
| 2018/0176417 A1 | 6/2018 | Ando | |
| 2018/0357036 A1* | 12/2018 | Tomita | H04N 7/147 |
| 2019/0014004 A1* | 1/2019 | Horiuchi | H04L 41/0893 |
| 2019/0020770 A1* | 1/2019 | Araki | H04N 1/00954 |
| 2019/0034126 A1* | 1/2019 | Iwashita | G06F 3/1292 |
| 2019/0278468 A1* | 9/2019 | Tomono | G06F 1/1698 |

FOREIGN PATENT DOCUMENTS

| | | |
|---|---|---|
| CN | 102780757 A | 11/2012 |
| JP | 2004-215999 A | 1/2004 |
| JP | 2004-287564 A | 10/2004 |
| JP | 2004-362257 A | 12/2004 |
| JP | 2005-352584 A | 12/2005 |
| JP | 2011-221706 A | 11/2011 |
| JP | 2012-512473 A | 5/2012 |
| JP | 2013-077279 | 4/2013 |
| JP | 2017-173891 | 9/2017 |
| JP | 2017-204708 A | 11/2017 |

OTHER PUBLICATIONS

Japanese Office Action dated Aug. 17, 2021, in corresponding Japanese Patent Application No. 2018-170602.
Summons to attend oral proceedings issued Apr. 6, 2022 in European Patent Application No. 19 192 342.4, 12 pages.
Anonymous: "WebSocket—Wikipedia", Apr. 26, 2018, XP055541050, Retrieved from the Internet: URL: https://en.wikipedia.org/w/index.php? title=WebSocket&oldid=838373221 [retrieved on Jan. 11, 2019], 6 pages.
Extended European Search Report dated Feb. 7, 2020 in corresponding European Patent Application No. 19192342.4, 7 pages.
Anders Andersen et al., "Experimenting with Instant Services Using NFC Technology", SMART 2012 : The First International Conference on Smart Systems, Devices and Technologies, XP055663764, 2012, pp. 73-78.
Office Action dated Feb. 20, 2023 in Chinese Patent Application No. 201910857524.5, 17 pages.
Chinese Office Action dated Jun. 19, 2023, in corresponding Chinese Patent Application No. 201910857524.5, 5pp.

\* cited by examiner

FIG. 8

| TENANT ID | COMMUNI-CATION ID | ADDRESS INFORMATION | STATE INFORMATION | BROWSER ID | BROWSER STATE |
|---|---|---|---|---|---|
| T001 | Eg001-01 | 10.56.60.xx | CONNECTED | BROWSER1 | POWER OFF |
| | Eg001-02 | 192.168.0.xx | NOT CONNECTED | BROWSER2 | POWER OFF |
| .. | .. | .. | .. | .. | .. |

| REGISTRA-TION ID | In APPLICATION ID | Out APPLICATION ID | BROWSER ID |
|---|---|---|---|
| Tag01 | AP_Upload | AP_PhotoShow | BROWSER1 |
| : | : | : | : |

| APPLICATION ID | APPLICA-TION TYPE | URL |
|---|---|---|
| AP_PhotoShow | Out | https://daas.com/photoshow |
| AP_Upload | In | https://daas.com/upload |

121

| TENANT ID | USER ID | ... | ~123 |
|---|---|---|---|
| T001 | gest | ... | |
| | taro | ... | |
| | ... | ... | |
| : | : | : | |

FIG. 19

| TENANT ID | USER ID | MESSAGE USER ID | ... |
|---|---|---|---|
| T001 | gest | ... | ... |
| | taro | ... | ... |
| | ... | ... | ... |
| : | : | : | : |

123

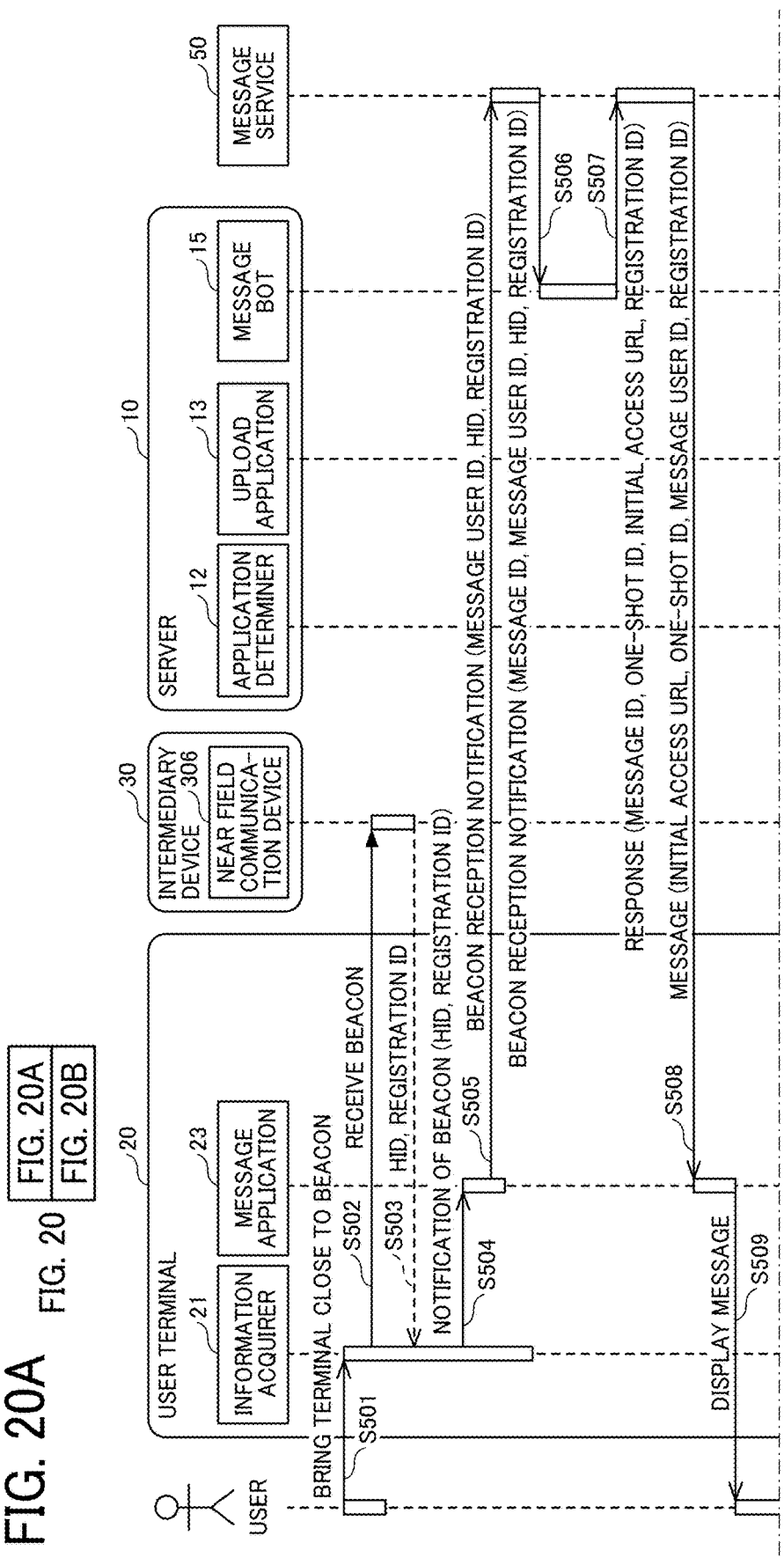

INFORMATION PROCESSING APPARATUS, INFORMATION PROCESSING SYSTEM, INFORMATION PROCESSING METHOD AND RECORDING MEDIUM

CROSS-REFERENCE TO RELATED APPLICATIONS

This application is a continuation application of U.S. patent application Ser. No. 17/237,270, filed Apr. 22, 2021 (now issued U.S. Pat. No. 11,588,919), which is a continuation application of U.S. patent application Ser. No. 16/550,360, filed Aug. 26, 2019 (now issued U.S. Pat. No. 11,019,176), which is based on and claims priority pursuant to 35 U.S.C. § 119(a) to Japanese Patent Application No. 2018-170602, filed on Sep. 12, 2018, in the Japan Patent Office, the entire disclosure of each is hereby incorporated by reference herein.

BACKGROUND

Technical Field

The present invention relates to an information processing apparatus, an information processing system, an information processing method and recording medium.

Description of the Related Art

An improvement in work efficiency can be expected by utilizing various types of devices. For example, by projecting or displaying data stored in a personal computer (PC) or the like, using a device such as a projector or an electronic whiteboard, information sharing can be efficiently performed in work.

However, an operation of each device has become complicated due to advancement of functions or the like and a time required to learn how to operate the device has been extended. In addition, a fact that a user interface differs depending on the type of device or difference in manufacturers also extends learning of how to operate the device.

SUMMARY

Example embodiments of the present invention include an information processing apparatus communicably connected with an intermediary device capable of communicating with at least one device, the information processing apparatus including: circuitry configured to receive, from a terminal operated by a user, identification information that the terminal has acquired from the extraneous source; and transmit a request for execution of a process associated with the acquired identification information to the intermediary device, the request for execution causing the intermediary device to execute the process according to the request for execution to control the device.

Example embodiments of the present invention include an information processing system including the information processing apparatus, and the intermediary device.

Example embodiments of the present invention include an information processing method performed by the information processing apparatus, and a non-transitory recording medium storing a code for causing a computer system to carry out the information processing method.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIG. 8 is a diagram illustrating an example of a configuration of a device information storage unit;

FIG. 9 is a diagram illustrating an example of a configuration of a tag information storage unit;

FIG. 10 is a diagram illustrating an example of a configuration of an application information storage unit;

FIG. 19 is a diagram illustrating an example of a configuration of a user information storage unit in the second embodiment; and FIGS. 20A and 20B (FIG. 20) are a sequence diagram for explaining an example of a process procedure executed in response to proximity of the user terminal to a source of a message beacon.

Figure 1:
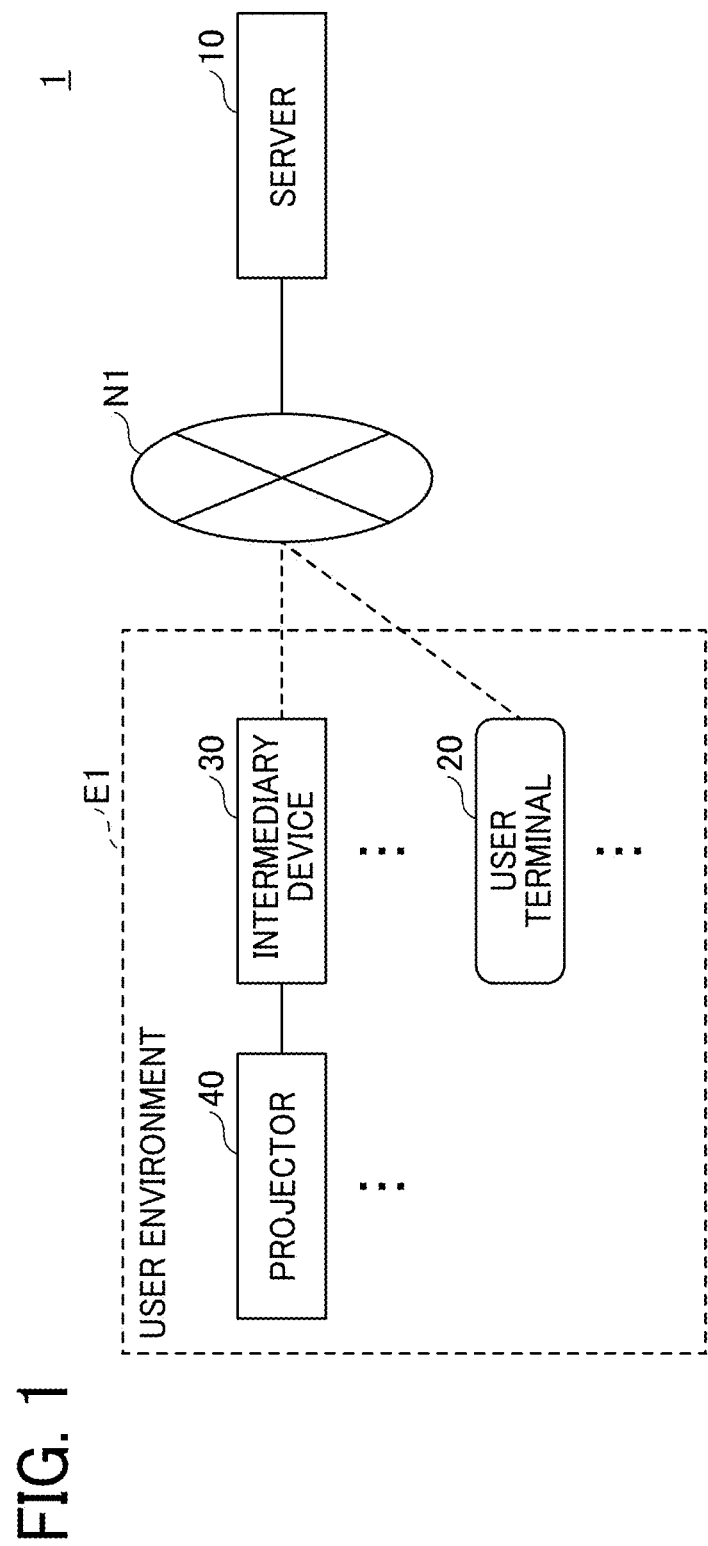
FIG. 1 is a diagram illustrating an example of a configuration of an information processing system according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

FIG. 1 is a diagram illustrating an example of a configuration of an information processing system according to a first embodiment. In an information processing system 1 illustrated in FIG. 1, a server 10 communicates with one or more apparatus or devices in a user environment E1 via a wide area network N1 such as the Internet. However, the network N1 may be a network that can be accessed within a predetermined range, such as an intranet.

The user environment E1 is a system environment in an organization such as a company in which output device such as one or more projectors 40 and one or more intermediary devices 30 reside. The projector 40 is a device that projects an input image on a projection plane, and is an example of the output device. In the user environment E1, each projector 40 is connected to the corresponding intermediary device 30. That is, in this embodiment, the projector 40 and the intermediary device 30 correspond one to one. The projector 40 and the intermediary device 30 are connected via an interface conforming to a standard capable of transmitting an image, such as High-Definition Multimedia Interface (HDMI) (registered trademark). For example, the projector 40 and the intermediary device 30 may be connected by a cable (for example, an HDMI (registered trademark) cable or the like) corresponding to the interface. Alternatively, a connector of the intermediary device 30 corresponding to the interface may be directly connected to a connector of the projector 40 corresponding to the interface. For example, the intermediary device 30 is inserted into the connector of the projector 40, and thus both may be connected. Alternatively, the intermediary device 30 and the projector 40 may be connected by wireless communication, or may be connected via a network. Alternatively, in another example, more than one device may be connected to one intermediary device 30. For example, a plurality of projectors provided with the Web API may be connected to one intermediary device 30.

By connecting the projector 40 and the intermediary device 30 as described above, the intermediary device 30 can transmit an image to be projected to the projector 40.

The intermediary device 30 is connected to the network N1 via a LAN or the like in the user environment E1. The intermediary device 30 may be wirelessly connected to the LAN or the like in the user environment E1. The intermediary device 30 is provided with a Web browser, and by the Web browser, executes a process according to a request for execution of a process related to image data transmitted from the server 10, thereby controlling the output device such as the projector 40 (for example, outputting an execution result of the process to the projector 40). Specifically, in the present embodiment, the intermediary device 30 causes the projector 40 to execute an output (for example, projection) of the image data. That is, the intermediary device 30 mediates the output (for example, projection) of the image by the projector 40 for the data transmitted from the server 10. For example, a computer such as an HDMI (registered trademark) dongle or a stick PC may be used as the intermediary device 30.

A user terminal 20 is an information processing terminal operated by each user in the user environment E1. For example, a smartphone, a tablet terminal, a PC, a mobile phone, or the like may be used as the user terminal 20. Preferably, the user terminal 20 may be a mobile terminal. The user terminal 20 is connectable to the network N1 without via the LAN or the like in the user environment E1 (for example, via a mobile communication network, etc.). However, the user terminal 20 may be connectable to a network in the user environment E1.

The server 10 is one or more computers that execute a process for executing output by the output device such as the projector 40 on image data specified in the user terminal 20, by a simple operation using the user terminal 20. The server 10 may be installed in the user environment E1.

Figure 2:
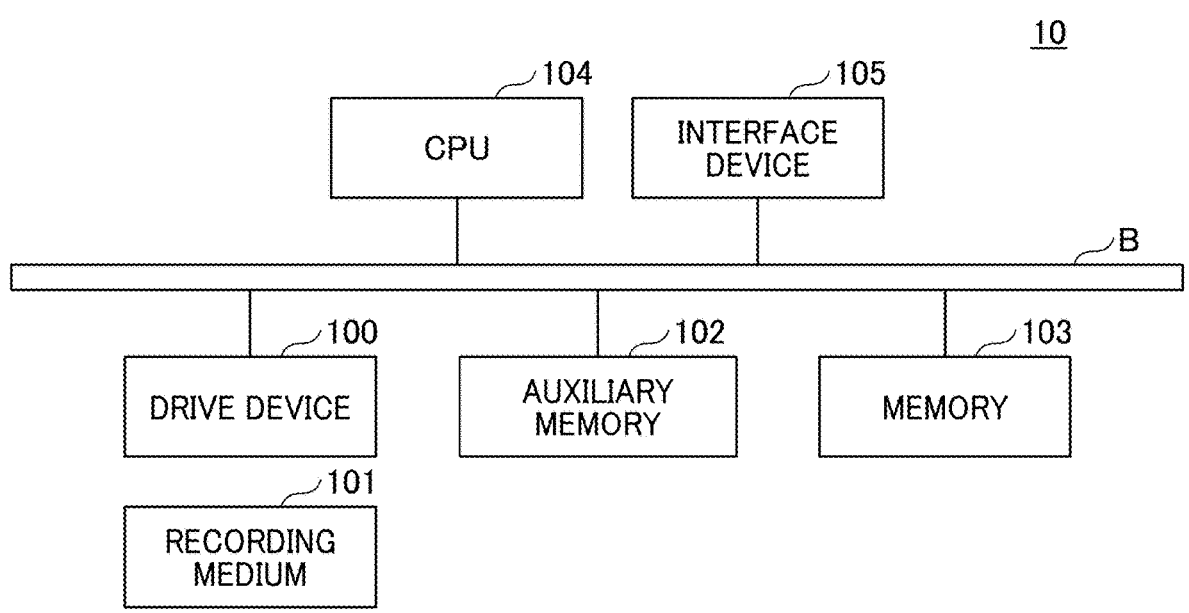
FIG. 2 is a diagram illustrating an example of a hardware configuration of a server according to the first embodiment.

FIG. 2 is a diagram illustrating an example of a hardware configuration of the server 10 according to the first embodiment. The server 10 of FIG. 2 includes a drive device 100, an auxiliary memory 102, a memory 103, a central processing unit (CPU) 104, an interface device 105, and the like that are mutually connected by a bus B.

A program for executing a process in the server 10 is provided by a recording medium 101 such as a CD-ROM. When the recording medium 101 storing the program is set in the drive device 100, the program is installed from the recording medium 101 into the auxiliary memory 102 via the drive device 100. However, the program may not be installed from the recording medium 101, and may be downloaded from another computer via the network. The auxiliary memory 102 stores the installed program and also stores required files, data or the like.

When there is an instruction to start the program, the memory 103 reads out the program from the auxiliary memory 102 and stores the program. The CPU 104 executes a function related to the server 10 in accordance with the program stored in the memory 103. The interface device 105 is used as an interface for connecting to the network.

Figure 3:
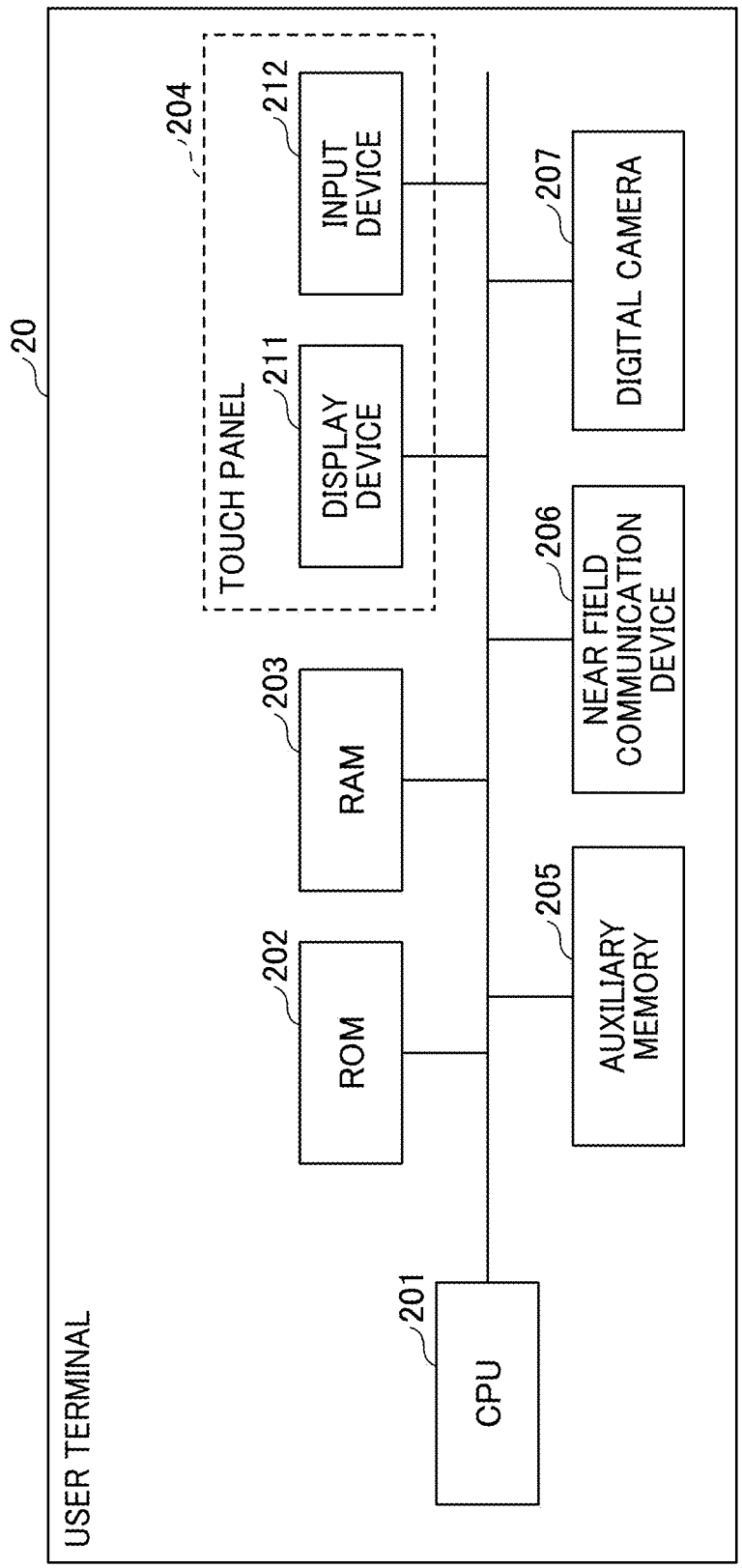
FIG. 3 is a diagram illustrating an example of a hardware configuration of a user terminal according to the first embodiment.

FIG. 3 is a diagram illustrating an example of a hardware configuration of the user terminal 20 according to the first embodiment. In FIG. 3, the user terminal 20 includes a CPU 201, a ROM 202, a RAM 203, a touch panel 204, an auxiliary memory 205, a near field communication device 206, a digital camera 207, and the like.

The ROM 202 and the auxiliary memory 205 store programs and the like installed in the user terminal 20. When there is an instruction to start the program, the RAM 203 reads out the program from the ROM 202 or the auxiliary memory 205 and stores the program. The CPU 201 implements a function related to the user terminal 20 in accordance with the program stored in the RAM 203.

The touch panel 204 is an electronic component including both an input function and a display function, and performs display of information, reception of an input from a user, and the like. The touch panel 204 includes a display 211, an input device 212, and the like.

The display 211 is a liquid crystal display or the like, and performs a display function of the touch panel 204. The input device 212 is an electronic component including a sensor that detects contact of a contact object with the display 211. The contact object refers to an object that contacts a contact surface (front surface) of the touch panel 204. Examples of such an object include a user's finger and a dedicated or general pen. The touch panel 204 may not be included, and the user terminal 20 may include the display 211 and the input device 212 separately. In addition, the display 211 may be externally connected to the user terminal 20. Moreover, the input device 212 is not limited to a sensor that detects a contact, and may also include an electronic component such as a hardware key, a keyboard, and a mouse.

The near field communication device 206 is hardware for performing near field communication. In the first embodiment, the near field communication device 206 reads information stored in a near field communication (NFC) tag. That is, in the first embodiment, the near field communication device 206 is preferably an NFC reader. The digital camera 207 is a general digital camera including an image capturing function, and may be embedded in the user terminal 20 as an electronic component, or may be externally connected to the user terminal 20.

Figure 4:
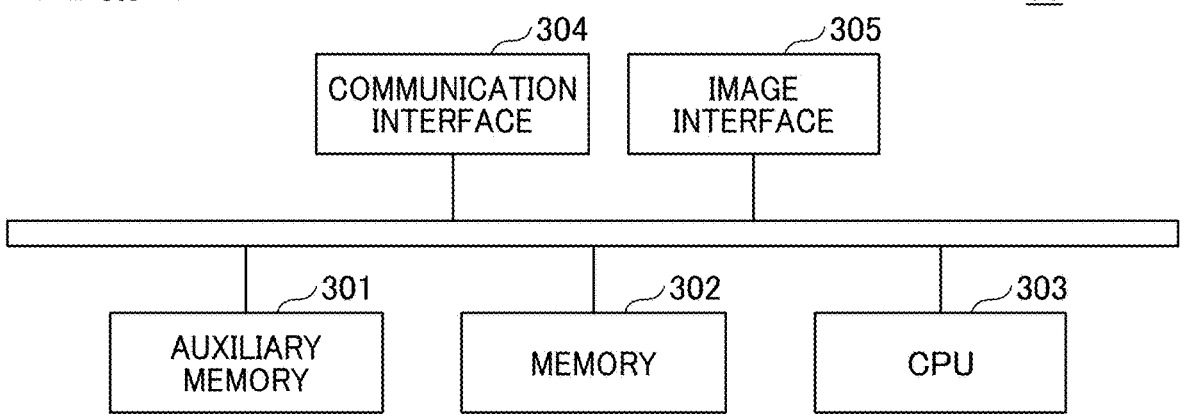
FIG. 4 is a diagram illustrating an example of a hardware configuration of an intermediary device according to the first embodiment.

FIG. 4 is a diagram illustrating an example of a hardware configuration of the intermediary device 30 in the first embodiment. The intermediary device 30 of FIG. 4 includes an auxiliary memory 301, a memory 302, a CPU 303, a communication interface 304, an image interface 305, and the like.

A program for executing a process in the intermediary device 30 is installed in the auxiliary memory 301. The auxiliary memory 301 stores the installed program and also stores required files, data or the like.

When there is an instruction to start the program, the memory 302 reads out the program from the auxiliary memory 301 and stores the program. The CPU 303 executes a function related to the intermediary device 30 in accordance with the program stored in the memory 302. The communication interface 304 is a physical interface for connecting to the network. The image interface 305 is a physical interface for transmitting an image to the projector 40.

Figure 5:
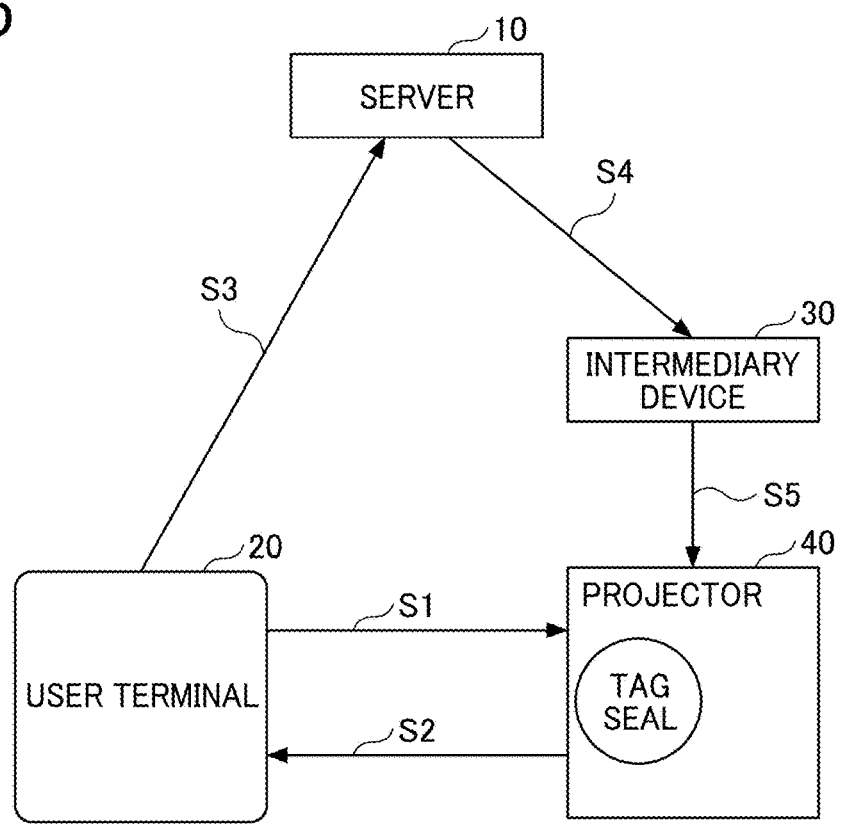
FIG. 5 is a diagram for explaining an outline of the first embodiment.

FIG. 5 is a diagram for explaining an outline of the first embodiment. As illustrated in FIG. 5, for example, a seal-like NFC tag (hereinafter simply referred to as "tag seal") is attached to the projector 40. In the tag seal, information (hereinafter referred to as "tag information") including a URL to be accessed first by the user terminal 20 (hereinafter referred to as "initial access URL") among URLs for accessing the server 10 is stored. In the tag information, the initial access URL is assigned a registration ID as option information. For example, the tag information has a following format.

https://xxx.yyy.com/?tagid=Tag01

Here, a part of "XXX" in "tagid=XXX" (in the above, "Tag01") corresponds to the registration ID. The registration ID is identification information registered in the server 10. A different registration ID may be allocated to each tag seal, or a same registration ID may be allocated to a plurality of tag seals. Meanwhile, a part "https://xxx.yyy.com/" (initial access URL) may be common to the tag information stored in each tag seal used in the user environment E1. The registration ID may not be included in the initial access URL, and may be stored separately from the initial access URL.

For example, the user terminal 20 is brought into close contact with the tag seal attached to the projector 40 by the user (S1), the near field communication device 206 of the user terminal 20 reads the tag information stored in the tag seal, thereby acquiring the tag Information (S2). Subsequently, the user terminal 20 accesses the server 10 that is a destination ("https://xxx.yyy.com") of the initial access URL included in the acquired tag information (S3). The registration ID and the like included in the acquired tag information are also transmitted to the server 10.

The server 10 controls an execution of a service registered in advance in association with the registration ID. For example, if the service is to cause a specific projector 40 to project image data captured by the user terminal 20, the server 10 acquires from the user terminal 20 image data captured by the user terminal 20 and transmits the image data to the intermediary device 30 associated with the registration ID (S4). For example, the server 10 transmits, to the user terminal 20, display data of a screen prompting an upload of the image data and receives, from the user terminal 20, the image data captured by the user terminal 20 in accordance with an operation by the user via the screen, thereby acquiring the image data.

When the intermediary device 30 receives the image data from the server 10, the intermediary device 30 renders the image data. As a result, a rendering result is transmitted to the projector 40. The projector 40 projects the rendering result (that is, the image data).

Therefore, the user can receive a service related to the output device as described above by a simple operation such as acquiring tag information from an outside of the user terminal 20. For example, in the example described above, the service as described above can be received by a simple operation such as bringing the user terminal 20 in proximity to the tag seal disposed in (attached to) the projector 40. As described above, the service to be executed is identified in accordance with the registration ID. That is, a different service can be associated with each registration ID.

In order to execute the process explained with reference to FIG. 5, the user terminal 20, the intermediary device 30, and the server 10 include functional configurations as illustrated in FIG. 3.

Figure 6:
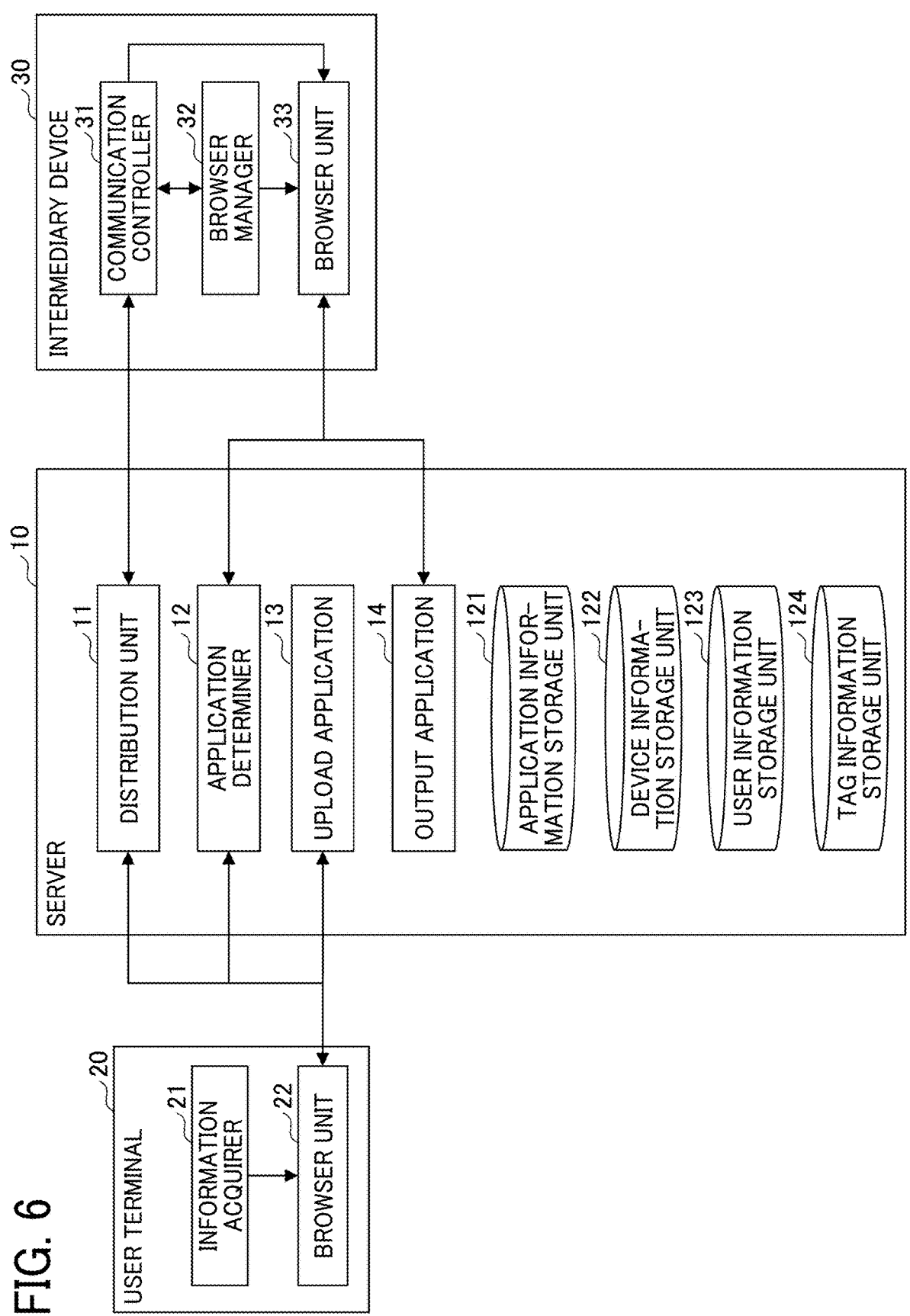
FIG. 6 is a diagram illustrating an example of a functional configuration of each device in the first embodiment.

FIG. 6 is a diagram illustrating an example of a functional configuration of each device in the first embodiment. In FIG. 6, the user terminal 20 includes an information acquirer 21 and a browser unit 22. These units are implemented by instructions of the CPU 201 according to one or more programs installed in the user terminal 20.

The information acquirer 21 acquires tag information (initial access URL including the registration ID) from the tag seal with the use of the near field communication device 206, and activates the browser unit 22 with the tag information as input information. The information acquirer 21 may be implemented by a process that a part of an operating system (OS) of the user terminal 20 causes the CPU 201 to execute.

The browser unit 22 is, for example, a general Web browser, and executes a process according to HyperText Markup Language (HTML) data, a script (for example, JavaScript (registered trademark)), and the like. The browser unit 22 transmits, to an application determiner 12 of the server 10 corresponding to the initial access URL included in the tag information notified as input information from the information acquirer 21, the registration ID or the like included in the tag information URL. The browser unit 22 also accesses an application associated with the registration ID among applications included in the server 10, in accordance with a redirect request which is a response from the application determiner 12 to the access to the initial access URL. The browser unit 22 acquires, from the application, data (HTML data, script, etc.) indicating a request for the user terminal 20 to execute a process.

The intermediary device 30 includes a communication controller 31, a browser manager 32, a browser unit 33, and the like. These units are implemented by instructions that one or more programs installed in the intermediary device 30 cause the CPU 303 to execute.

The communication controller 31 connects a bidirectional communication path with a distribution unit 11 of the server 10 (establishes a communication session), and functions as an end point on the intermediary device 30 side in the communication path (communication session). By communication via the communication path (communication session), a state of the intermediary device 30 is notified to the server 10 and a notification that image data to be projected by the intermediary device 30 onto the projector 40 has been input to the server 10 (in the present embodiment, a notification that the image data has been uploaded from the user terminal 20) can be received from the server 10.

The browser manager 32 activates the browser unit 33 in, for example, a kiosk mode. The kiosk mode is a mode in which a use of the intermediary device 30 is limited to a display of a Web page. The kiosk mode is merely an example, and other modes may be used as long as the Web page can be displayed.

The browser unit 33 is, for example, a general Web browser, and executes a process according to HTML data, a script, and the like. The browser unit 33 accesses the initial access URL (that is, the application determiner 12 of the server 10) in response to the activation. In doing so, identification information of the browser unit 33 (hereinafter referred to as "browser ID") is assigned as option information to the initial access URL. The browser unit 33 also accesses an application associated with the browser ID among the applications included in the server 10, in accordance with a redirect request which is a response from the application determiner 12 to the access to the initial access URL. The browser unit 33 acquires, from the application, data (HTML data, script, etc.) indicating a request for the intermediary device 30 to execute a process.

The server 10 includes the distribution unit 11, the application determiner 12, an upload application 13, an output application 14, and the like. These units are implemented by processes that one or more programs installed in the server 10 cause the CPU 104 to execute. The server 10 also includes an application information storage unit 121, a device information storage unit 122, a user information storage unit 123, a tag information storage unit 124, and the like. These storage units can be implemented with the use of, for example, the auxiliary memory 102 or a storage device connectable to the server 10 via the network.

The distribution unit 11 receives image data to be an input for a service associated with the registration ID, from an input source of the image data, and notifies an output destination of the image data in the service of an input of the image data. In addition, the distribution unit 11 transmits the image data to the output destination in response to a request from the output destination. In the present embodiment, the input source is the user terminal 20, and the output destination is the intermediary device 30.

The application determiner 12 determines an application corresponding to the initial access URL. The application determiner 12 determines an application corresponding to the option information (registration ID or browser ID) assigned to the initial access URL with reference to the tag information storage unit 124 in response to the access to the initial access URL. The application determiner 12 transmits a response including a redirect request including the URL for the determined application, to a source that has accessed the initial access URL. In the present embodiment, with regard to an access from the user terminal 20 that is the input source of the image data, the URL of the upload application 13 is determined as an application corresponding to the registration ID. In addition, with regard to an access from the intermediary device 30 that is the output destination of the image data, the URL of the output application 14 is determined as an application corresponding to the browser ID.

The upload application 13 and the output application 14 are an example of an application included in the server 10 in the present embodiment. The upload application 13 is an application for causing the user terminal 20 to upload the image data. Specifically, the upload application 13 transmits, to the user terminal 20, HTML, data, a script, and the like for executing an upload of the image data. The output application 14 is an application for causing the intermediary device 30 to execute acquisition (download) and output of the image data uploaded from the user terminal 20. Specifically, the output application 14 transmits, to the intermediary device 30, HTML data, a script, and the like for causing the intermediary device 30 to execute the acquisition and the output.

Information (for example, a URL, etc.) related to each of the applications (the upload application 13 and the output application 14 in the present embodiment) included in the server 10 is stored in the application information storage unit 121.

The user information storage unit 123 stores identification information and the like of a user who can use the application in the server 10.

The device information storage unit 122 stores, for each intermediary device 30 disposed in the user environment E1, information indicating the state of the intermediary device 30.

The tag information storage unit 124 stores, for each registered ID, identification information of an application executing an input process of the image data, identification information of an application executing an output process of the image data, identification information of the browser unit 33 of the intermediary device 30 that is the input destination of the image data, and the like.

Figure 7A:
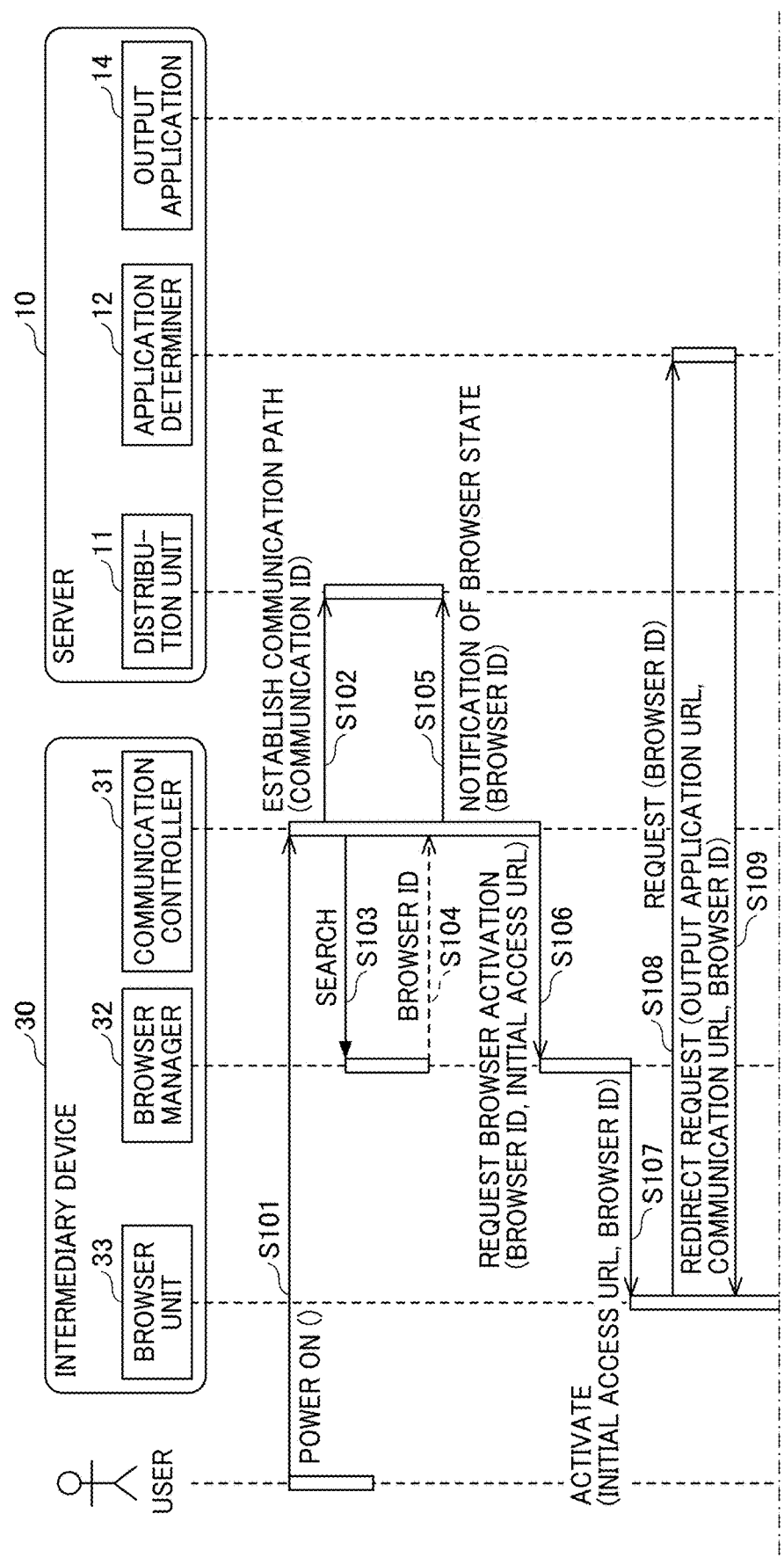
FIGS. 7A and 7B (FIG. 7) are a sequence diagram for explaining an example of a process procedure executed in response to activation of the intermediary device.
Figure 7B:
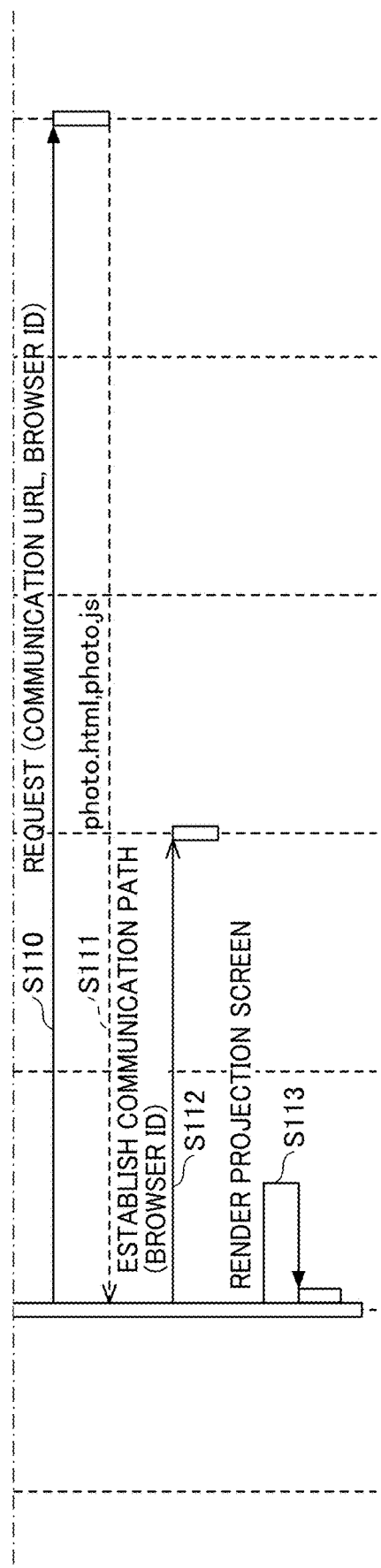

The process procedure executed in the information processing system 1 will be described below. FIG. 7 is a sequence diagram for explaining an example of a process procedure executed in response to activation of the intermediary device 30.

In response to user operation of turning on the intermediary device 30 (S101), the communication controller 31 establishes a communication path (session) with the distribution unit 11 for asynchronously receiving a request from the distribution unit 11 of the server 10 (S102). In doing so, the communication controller 31 notifies the distribution unit 11 of a communication ID which is identification information of the communication controller 31. The distribution unit 11 updates the device information storage unit 122 based on the notified communication ID (hereinafter, referred to as "target communication ID").

FIG. 8 is a diagram illustrating an example of a configuration of the device information storage unit 122. In FIG. 8, the device information storage unit 122 stores a communication ID, address information, state information, a browser ID, a browser state, and the like in association with a tenant ID. The tenant ID is identification information of a contractor (tenant) of a usage contract of a service provided by the server 10. For example, the user environment E1 may correspond to one tenant. The communication ID is identification information of the communication controller 31 of each intermediary device 30 disposed in the tenant related to the tenant ID. When the intermediary device 30 includes one communication controller 31, the communication ID may be identification information for identifying the intermediary device 30. The address information is a local IP address of the intermediary device 30. The state information is information indicating whether the communication controller 31 related to the communication ID is being connected to the server 10 or not (in a state where the communication path is established or not established). The browser ID is identification information of the browser unit 33 corresponding to the communication controller 31 related to the communication ID. In the present embodiment, the browser ID is identification information of the browser unit 33 included in the same intermediary device 30 in which the communication controller 31 related to the communication ID is included. The browser state is information indicating an activation state of the browser unit 33 related to the browser ID.

For example, if the target communication ID notified to the distribution unit 11 is "Eg001-01", the state information corresponding to the communication ID in the device information storage unit 122 is changed to "connected" as illustrated in FIG. 8.

Subsequently, the communication controller 31 searches for the browser manager 32 with the use of, for example, Simple Network Management Protocol (SNMP) or the like in order to acquire the browser ID (S103), and acquires, from the found browser manager 32, the browser ID that is identification information of the browser unit 33 managed by the browser manager 32 (S104). In the present embodiment, an example in which the communication controller 31 and the browser manager 32 are included in the intermediary device 30 is illustrated, and in order for the communication controller 31 included in the intermediary device 30 to communicate with the browser manager 32 included in another intermediary device 30 via a same network to thereby make a plurality of browser managers 32 and browser units 33 also available, the browser managers 32 are searched for with the use of the SNMP or the like. Therefore, the browser manager 32 may not be searched for, and an acquisition destination (the browser manager 32) from which the communication controller 31 acquires the browser ID may be set in advance.

Subsequently, the communication controller 31 transmits, to the distribution unit 11, a notification that the browser unit 33 (in the present embodiment, the browser unit 33 of the intermediary device 30) corresponding to the acquired browser ID has become available, while specifying the browser ID of the browser unit 33 (hereinafter referred to as "target browser ID") (S105). In response to reception of the notification, the distribution unit 11 updates the device information storage unit 122 (FIG. 8) based on the target browser ID specified in the notification. Specifically, in the device information storage unit 122, a value of the browser state corresponding to the target browser ID is updated from "power off" to "power on".

Subsequently, the communication controller 31 requests the browser manager 32 to activate the browser unit 33 related to the target browser ID while specifying the target browser ID and the initial access URL (S106). As described above, the initial access URL refers to a URL that the browser unit 33 is to first access, and is set in advance in the browser manager 32.

In response to the request from the communication controller 31, the browser manager 32 activates the browser unit 33 related to the target browser ID in the kiosk mode (S107). In doing so, the browser manager 32 inputs the initial access URL to the browser unit 33. The browser unit 33 transmits an HTTP request to the input initial access URL in response to the activation in the kiosk mode (S108). The HTTP request includes the target browser ID.

In response to reception of the HTTP request, the application determiner 12 of the server 10 transmits, to the browser unit 33, a response (HTTP response) including a redirect request (S109). The redirect request includes a URL of an application associated with the browser ID as a redirect destination. In addition, the redirect request includes a communication URL and the target browser ID included in the HTTP request as notification information for the redirect destination. The communication URL is a URL of the communication controller 31.

The application determiner 12 identifies the URL of the application associated with the target browser ID with reference to the tag information storage unit 124 and the application information storage unit 121.

FIG. 9 is a diagram illustrating an example of a configuration of the tag information storage unit 124. In FIG. 9, the tag information storage unit 124 stores a registration ID, an In application ID, an Out application ID, and a browser ID in association with one other.

The In application ID is an ID of an application that controls an input of image data in a service corresponding to the registration ID (hereinafter referred to as an "application ID"). The "AP_Upload" indicates an application ID of the upload application 13. The Out application ID is an application ID of an application that controls an output of image data in the service corresponding to the registration ID. The "AP_PhotoShow" indicates an application ID of the output application 14. The browser ID is the browser ID of the browser unit 33 corresponding to the registration ID.

FIG. 10 is a diagram illustrating an example of a configuration of the application information storage unit 121. In FIG. 10, the application information storage unit 121 stores an application ID, an application type, a URL, and the like for each application included in the server 10.

The application type indicates a type based on a relation with the image data for an application related to the application ID. The "In" indicates that the application controls an input of image data (corresponding to the above-described In application ID). The "Out" indicates that the application controls an output of image data (corresponding to the above-described Out application ID). The URL is a URL of the application related to the application ID.

Therefore, the application determiner 12 refers to the tag information storage unit 124 to identify the Out application ID associated with the target browser ID, and refers to the application information storage unit 121 to identify the URL associated with the Out application ID. Here, it is assumed that the target browser ID is "BROWSER1". In this case, the URL of the application (output application 14) whose application ID is the "AP_PhotoShow" (hereinafter, "output application URL") is identified.

In addition, the application determiner 12 automatically generates the communication URL of the communication controller 31 related to the target communication ID on the basis of the address information associated with the target browser ID in the device information storage unit 122 (FIG. 8).

Subsequently, in accordance with the redirect request, the browser unit 33 transmits (redirects) an HTTP request to the output application URL that is the redirect destination (i.e., the output application 14) (S110). The HTTP request includes the communication URL and the browser ID included in the redirect request.

In response to the HTTP request, the output application 14 transmits, to the browser unit 33, a response including a script (photo.js) for causing the browser unit 33 to execute connection to the communication URL included in the HTTP request and display data (photo. html) for causing the browser unit 33 to render a user interface for outputting image data (for example, a slide show) (S111). The script and the display data are an example of data indicating a request for the intermediary device 30 to execute a process.

In response to reception of the response, the browser unit 33 executes the script (photo.js) included in the response to establish a communication path with the communication controller 31 identified by the communication URL (S112). The communication path is a communication path for the communication controller 31 to transmit, to the browser unit 33, a notification received from the server 10. For the communication path, websocket may be used.

Subsequently, the browser unit 33 renders a screen (hereinafter referred to as "projection screen") based on the display data (photo. html) included in the response, in a predetermined area (for example, a video memory) of the memory 103 (S113). For example, the projection screen is a screen that functions as a frame to which the image data distributed from the server 10 is applied. The content rendered by the browser unit 33 (projection screen) is output to the projector 40 via the HDMI (registered trademark) or the like and is output (projected) by the projector 40.

Figure 11:
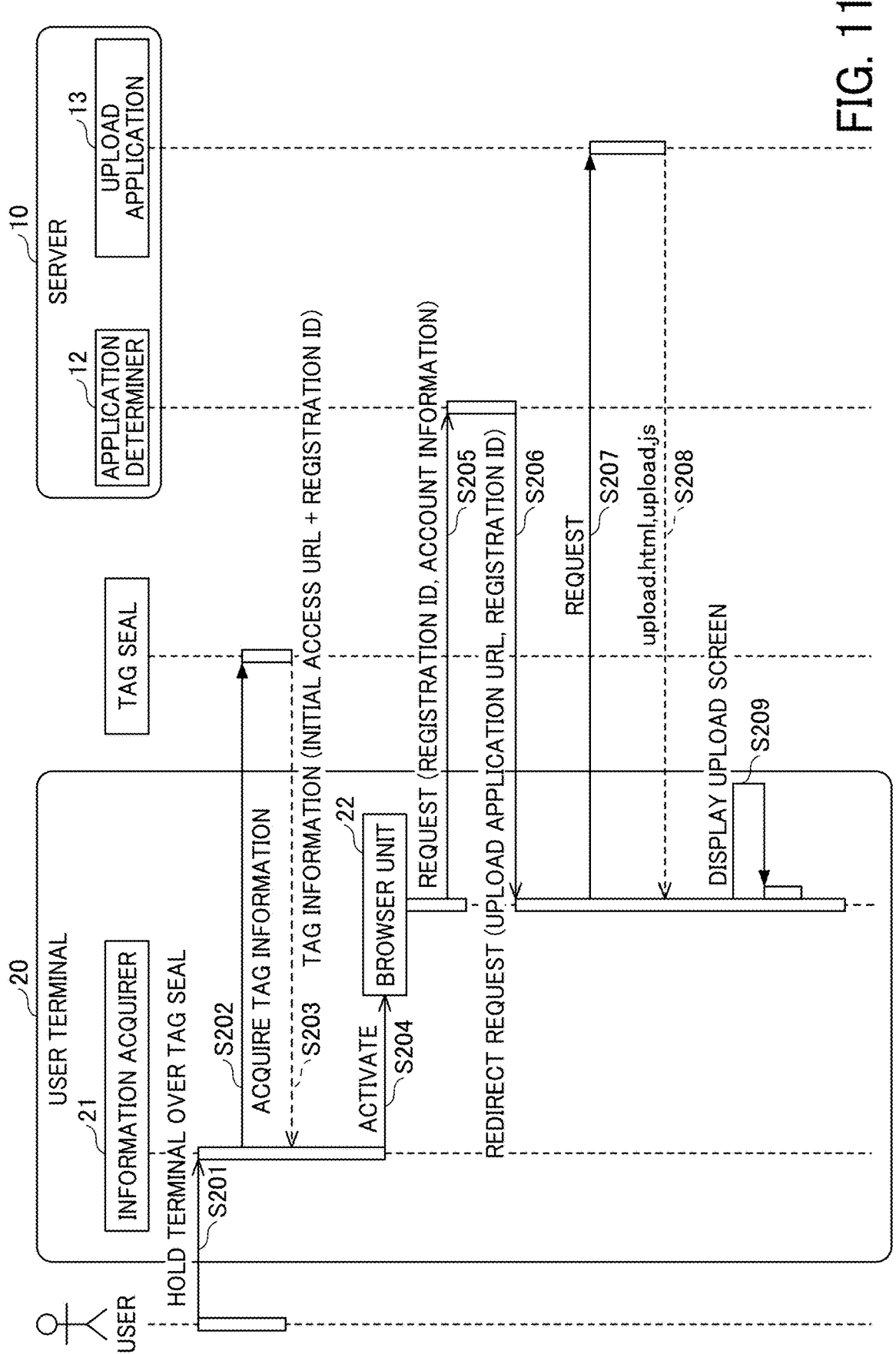
FIG. 11 is a sequence diagram for explaining an example of a process procedure executed in response to proximity of a user terminal to a tag seal.

FIG. 11 is a sequence diagram for explaining an example of a process procedure executed in response to proximity of the user terminal 20 to the tag seal.

For example, when the user brings the user terminal 20 close to the tag seal attached to the projector 40 (for example, when the terminal 20 is held over the tag seal) (S201), the information acquirer 21 acquires the tag information stored in the tag seal via near field communication using the near field communication device 206 (S202 and S203). The tag information includes the initial access URL to which the registration ID (hereinafter referred to as "target registration ID") is assigned as option information. In the present embodiment, it is assumed that a value of the target registration ID is "Tag 01".

Subsequently, the information acquirer 21 activates the browser unit 22 with the tag information as input information on the basis of a fact that the tag information includes the URL (S204).

In response to the activation, the browser unit 22 automatically transmits an HTTP request to the application determiner 12 corresponding to the initial access URL included in the tag information that is the input information (S205). The HTTP request includes account information as option information in addition to the target registration ID. The account information is information including identification information of the user of the user terminal 20 (hereinafter referred to as "user ID") and the tenant ID of the user environment E1 to which the user belongs, or is information by which the user ID and the tenant ID can be identified. For example, a Cookie or the like may be used as the account information.

In response to reception of the HTTP request, the application determiner 12 of the server 10 authenticates the account information included in the HTTP request. If the authentication is successful, step S206 and subsequent steps are executed. The authentication is performed on the basis of, for example, whether the account information included in the HTTP request is registered in the user information storage unit 123.

Figures 12, 13:
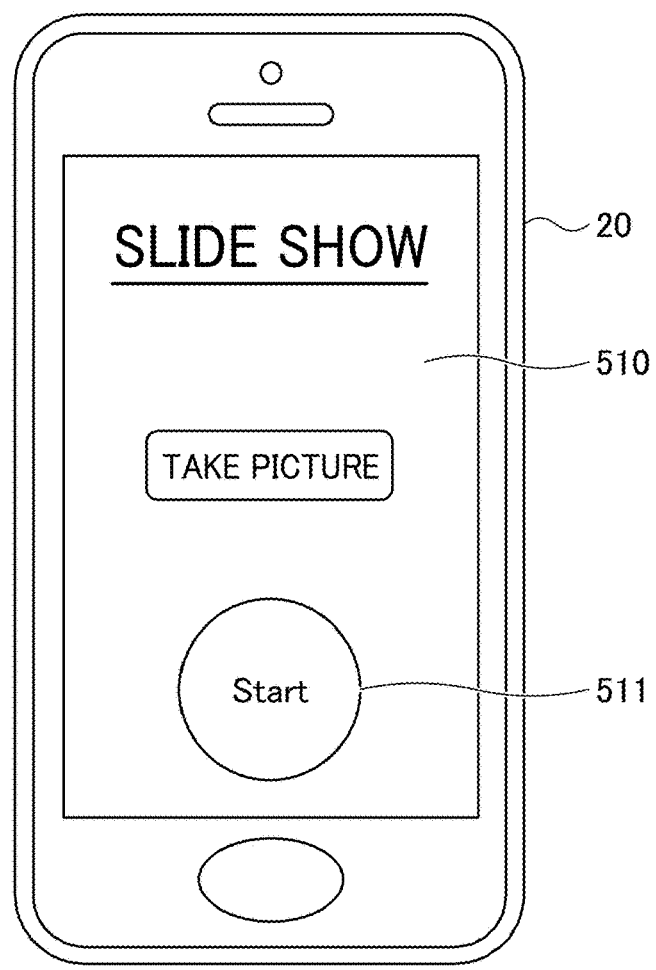
FIG. 12 is a diagram illustrating an example of a configuration of a user information storage unit.
FIG. 13 is a diagram illustrating a display example of an upload screen.

FIG. 12 is a diagram illustrating an example of a configuration of the user information storage unit 123. In FIG. 12, the user information storage unit 123 stores the tenant ID, the user ID and the like for each user who is permitted to use an application of the server 10.

If the authentication is successful, the application determiner 12 transmits a response (HTTP response) including a redirect request to the browser unit 22 (S206). The redirect request includes a URL of the upload application 13 (hereinafter referred to as "upload application URL") related to the In application ID ("AP_Upload") stored in the tag information storage unit 124 (FIG. 9) in association with the target registration ID ("Tag01") as the redirect destination. The upload application URL can be identified with reference to the application information storage unit 121 (FIG. 10).

In accordance with the redirect request, the browser unit 22 transmits an HTTP request (redirect) to the upload application URL that is the redirect destination (i.e., the upload application 13) (S207).

In response to the HTTP request, the upload application 13 transmits, to the browser unit 22, a response including display data (upload.html) of a screen (hereinafter referred to as "upload screen") related to an upload of image data to the distribution unit 11 of the server 10 and a script (upload.js) for causing the user terminal 20 to execute the upload in accordance with an operation on the upload screen (S208). The script and the display data are an example of data indicating a request for the user terminal 20 to execute a process.

In response to reception of the response, the browser unit 22 generates an upload screen on the basis of the display data (upload.html) and displays the upload screen on the display 211 (S209).

FIG. 13 is a diagram illustrating a display example of the upload screen. In FIG. 13, an upload screen 510 includes a button 511 and the like. The button 511 is a screen for receiving an instruction to start an image capturing operation. The user selects the button 511 to perform image capturing. As a result, the captured image data is displayed on the display 211.

Figure 14:
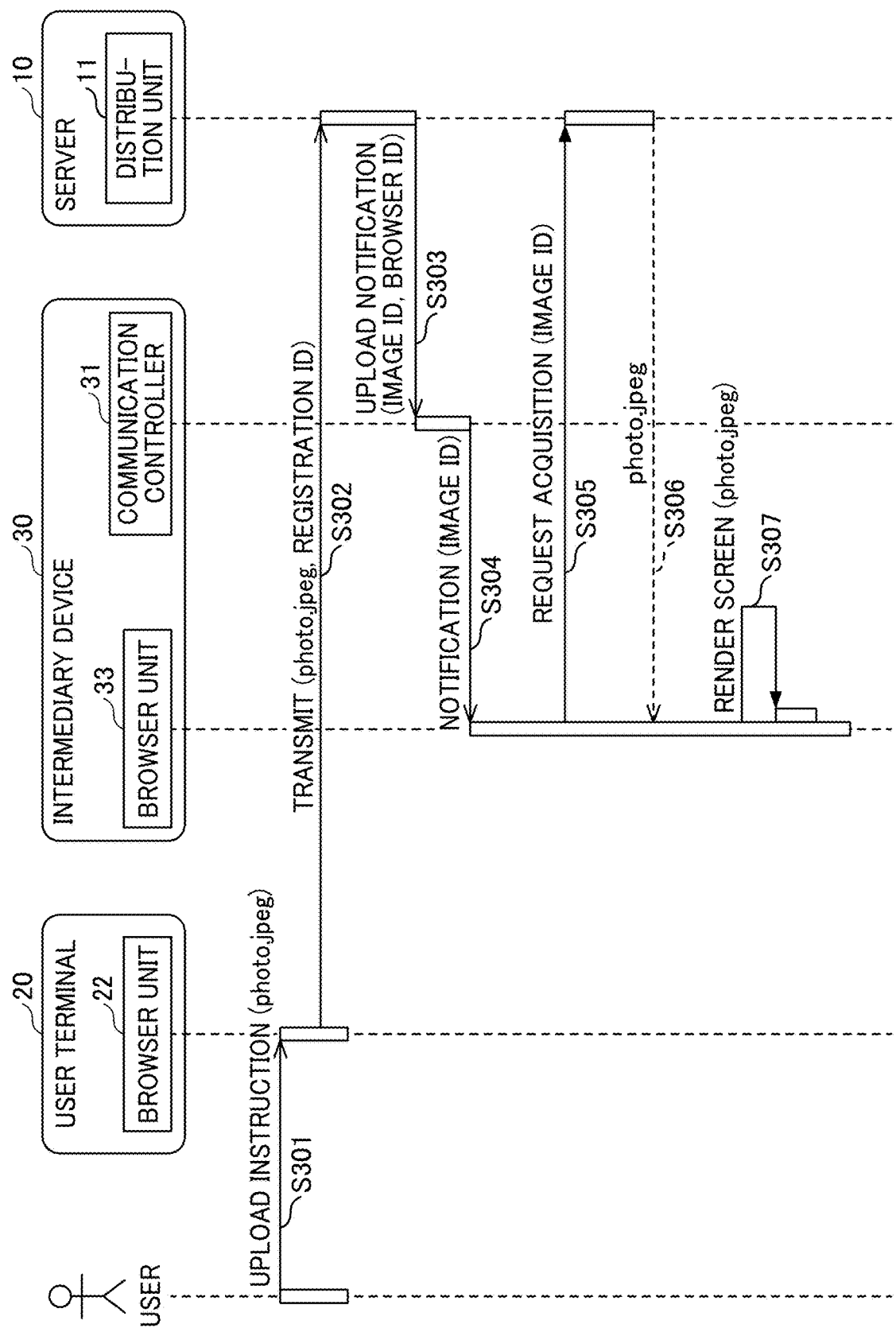
FIG. 14 is a sequence diagram for explaining an example of a process procedure of a process for delivering image data from the user terminal to the intermediary device.

FIG. 14 is a sequence diagram for explaining an example of a process procedure of a process for delivering image data from the user terminal 20 to the intermediary device 30.

When the user performs a predetermined operation (for example, swipe, etc.) corresponding to an upload instruction on the image data (hereinafter referred to as "target image data") displayed on the display 211 of the user terminal 20 (S301), the browser unit 22 transmits (uploads) target image data (photo.jpeg) and a target registration ID to the distribution unit 11 of the server 10 in accordance with a definition of the script (upload.js) (S302). In response to reception of the target image data and the target registration ID, the distribution unit 11 allocates identification information (hereinafter referred to as "image ID") to the target image data, and stores the target image data in, for example, the auxiliary memory 102 or the like, in association with the image ID (hereinafter referred to as "target image ID").

Subsequently, the distribution unit 11 identifies the browser ID (target browser ID) stored in the tag information storage unit 124 (FIG. 9) in association with the target registration ID. The distribution unit 11 uses the communication path established with the communication controller 31 related to the communication ID (target communication ID) stored in the device information storage unit 122 (FIG. 8) in association with the target browser ID (the communication path established in step S102 of FIG. 7), to transmit, to the communication controller 31, a notification that the image data has been uploaded (hereinafter referred to as "upload notification") (S303). The upload notification includes the target image ID and the target browser ID.

In response to reception of the upload notification, the communication controller 31 uses the communication path established between the browser unit 33 corresponding to the browser ID included in the upload notification and the communication controller 31 (the communication path established in step S112 of FIG. 7), to notify the browser unit 33 of the target image ID included in the upload notification (S304).

In response to the notification from the communication controller 31, the browser unit 33 transmits a request for acquisition of the image data to the distribution unit 11 in accordance with the definition of the script (photo.js) (S305). The acquisition request includes the target image ID. In response to the acquisition request, the distribution unit 11 transmits, to the browser unit 33, a response including the image data (photo. jpeg) associated with the target image ID included in the acquisition request (S306).

In response to reception of the image data, the browser unit 33 renders the image data in a predetermined area (for example, a video memory) of the memory 103 so as to apply the image data in the projection screen rendered in step S113 of FIG. 7 (S307). The rendering content is transmitted to the projector 40 by the image interface 305 or the communication interface 304 of the intermediary device 30. As a result, the projector 40 projects the rendering content.

By the above-described process procedure, a service, in which the image data is output by the output device such as the projector 40 each time the user terminal 20 captures the image data, is implemented. For example, by using the service in a venue such as a party, a seminar, and an exhibition, it is possible to sequentially display and output image data captured in the venue on a large display screen.

While an example in which the device connected to the intermediary device 30 is the projector 40 is illustrated above, other device such as a digital signage, an electronic whiteboard, a display, or a printer may be connected to the intermediary device 30 as an alternative to the projector 40. In this case, the rendering content of the intermediary device 30 may be displayed on the digital signage, the electronic whiteboard, the display or the like, or may be printed by the printer.

In addition, while an example in which the tag seal is attached to the projector 40 associated with the tag seal is illustrated above for convenience of explanation, there is no limitation on the location where the tag seal is attached. For example, the tag seal may be attached to any position in a room in which the projector 40 is disposed.

As described above, according to the first embodiment, by bringing the user terminal 20 close to the tag seal, the user can cause the device (for example, the projector 40) connected to the intermediary device 30 to execute a process set in advance in association with the tag seal (registration ID). That is, the user does not need to directly operate the projector 40 or the like, and can operate the projector 40 or the like by an operation on the user terminal 20. Therefore, operability of device such as the projector 40 can be improved.

In addition, a screen displayed on the user terminal 20 is based on display data such as HTML, data distributed from the server 10, and a degree of dependence on the device associated with the tag seal is low. Therefore, according to the present embodiment, it is possible to reduce opportunity for the user to operate a different user interface such as an operation panel depending on the device, thereby enabling the user to use each device by a highly uniform operation across a plurality of pieces of device.

In addition, even in a case of device that does not include a network function, if the device includes an interface for transmitting image data, the present embodiment can be applied by interposing the intermediary device 30 between the server 10 and the device (the projector 40). Moreover, when it is desired to switch the device to which the image data is output, the device connected to the intermediary device 30 may be switched, and there is no need to change setting information in the server 10.

Further, in the present embodiment, a program included in a general smart phone or the like may also be installed in the user terminal 20, and a special application need not be installed in the user terminal 20.

Furthermore, since the intermediary device 30 and the device may be connected by an interface for transmitting image data, for example, setting for connection by a wireless LAN via a router or for connection by a wired LAN is not required.

While, in the first embodiment, an example in which the NFC tag is used as an example of an external recording medium storing the tag information is illustrated, the tag information may be acquired by a method other than the near field communication, so long as the user terminal 20 can acquire the tag information from the outside. For example, a seal on which a barcode or a two-dimensional code recording the tag information is printed may be used as an alternative to the tag seal. In this case, the user terminal 20 may acquire the tag information with the use of a bar code reader or a two-dimensional code reader, the digital camera 207 or the like. The bar code or the two-dimensional code may not be printed on the seal, and may be displayed on a display of the output device, for example, or may be printed on the output device per se or an external recording medium other than the seal. The tag seal of the NFC tag described above is merely an example, and similarly, the external recording medium other than the seal may include the NFC tag.

Alternatively, the user terminal 20 may receive a sound wave transmitted from a transmitting device installed in the periphery of the output device or included in the output device per se and a beacon that will be described later, and acquire the tag information embedded in the received sound wave or beacon.

Alternatively, the user terminal 20 may access, via a network, a device installed in the periphery of the output device or the output device per se to acquire the stored tag information.

Alternatively, the user terminal 20 may acquire the tag information from an external recording medium (for example, a seal) on which an image is printed. In this case, the user terminal 20 may input the image by the digital camera 207 and extract the tag information from a tint block or the like embedded in the image. A known technique may be used to embed information in an image using a tint block or the like or to extract information from the tint block.

Next, a second embodiment will be described. In the second embodiment, different points from the first embodiment will be described. Therefore, points that are not particularly mentioned may be the same as in the first embodiment.

In the second embodiment, a message application such as LINE (registered trademark) is used. In addition, in the second embodiment, a beacon for a message application 23 (a beacon based on near field communication such as Bluetooth (registered trademark) Low Energy (BLE)) including the registration ID is used as an alternative to the tag seal. Hereinafter, the beacon is referred to as a "message beacon".

Figure 15:
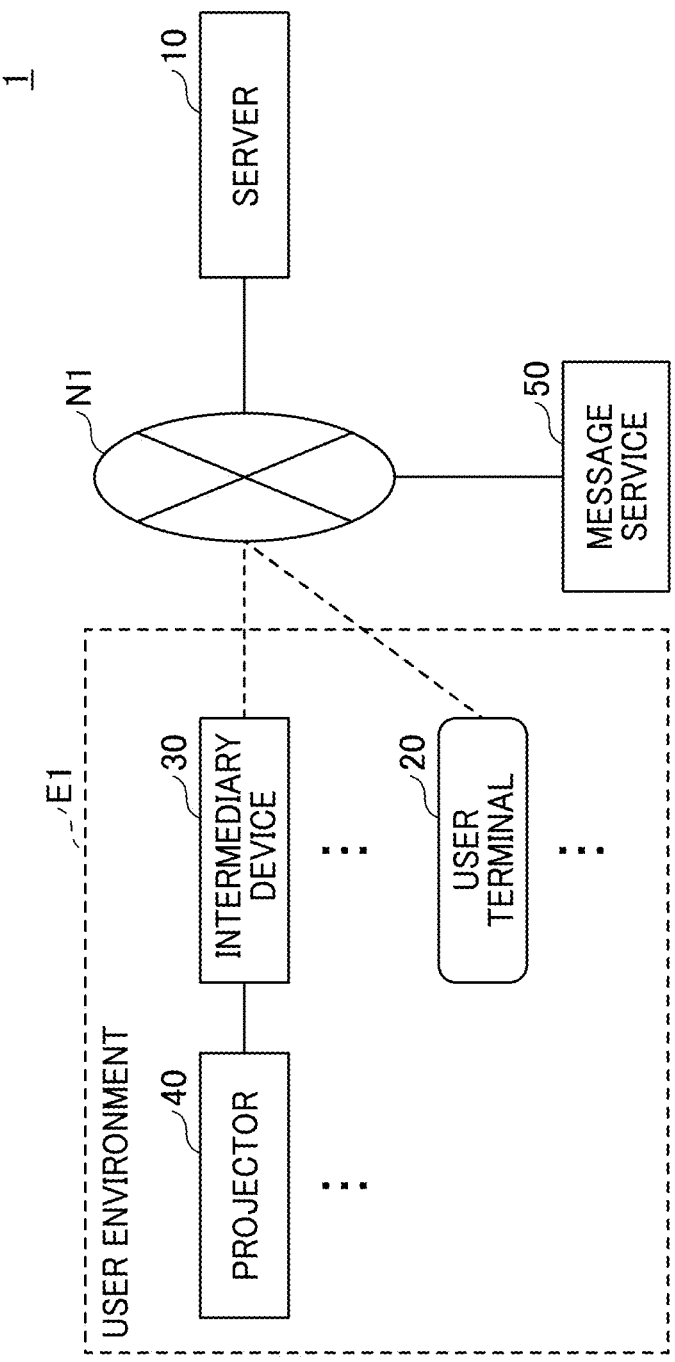
FIG. 15 is a diagram illustrating an example of a configuration of an information processing system in a second embodiment.

FIG. 15 is a diagram illustrating an example of a configuration of an information processing system in the second embodiment. In FIG. 15, same parts as those in FIG. 1 are denoted by same reference numerals, and a description thereof is omitted.

In FIG. 15, a message service 50 is further connected to the network N1. The message service 50 is one or more computers that provide a service to the message application 23 (function as a server for the message application 23). A user of the message application 23 performs user registration in the message service 50 and receives issuance of a user ID for the message application 23.

Figure 16:
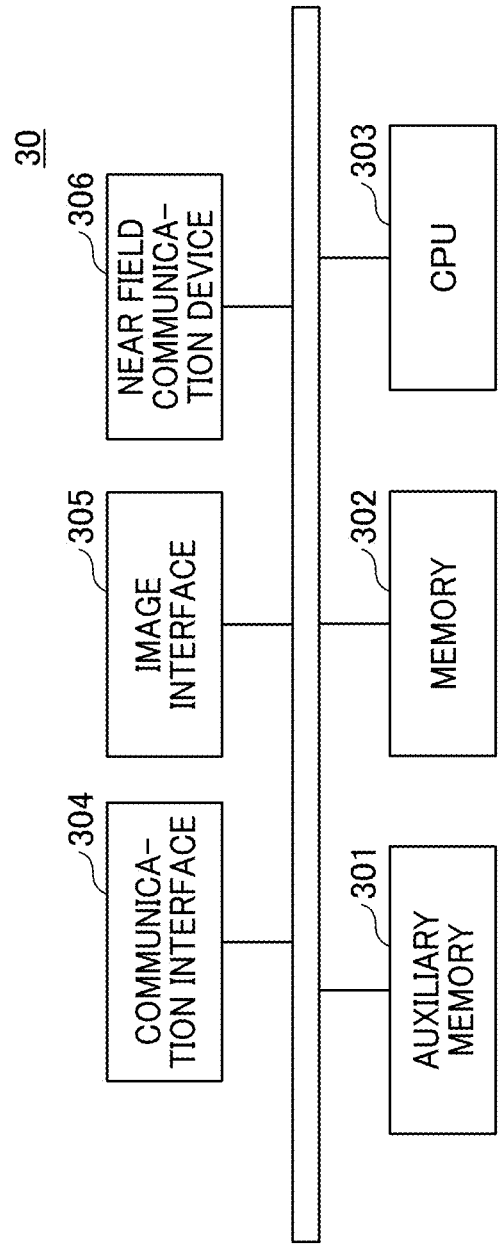
FIG. 16 is a diagram illustrating an example of a hardware configuration of an intermediary device in the second embodiment.

FIG. 16 is a diagram illustrating an example of a hardware configuration of the intermediary device 30 in the second embodiment. In FIG. 16, same parts as those in FIG. 4 are denoted by same reference numerals, and a description thereof is omitted. In FIG. 16, the intermediary device 30 further includes a near field communication device 306. The near field communication device 306 is hardware for performing near field communication such as BLE. In the present embodiment, the near field communication device 306 is used to transmit the message beacon.

Figure 17:
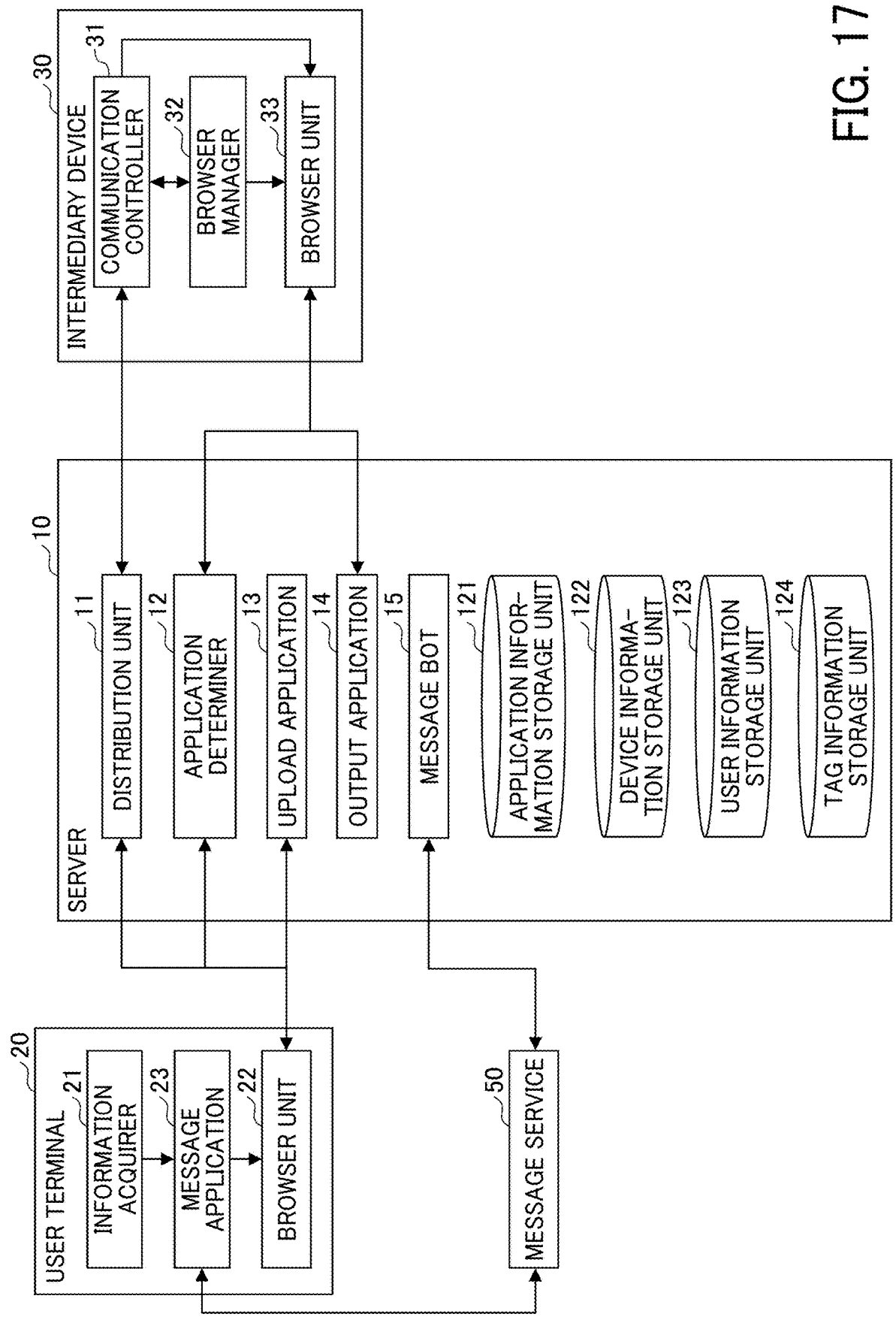
FIG. 17 is a diagram illustrating an example of a functional configuration of each device in the second embodiment.

FIG. 17 is a diagram illustrating an example of a functional configuration of each device in the second embodiment. In FIG. 17, same parts as those in FIG. 6 are denoted by same reference numerals, and a description thereof is omitted.

In FIG. 17, the user terminal 20 further includes the message application 23. The message application 23 is as described above.

The server 10 further includes a message bot 15. The message bot 15 is a program (Bot) that automatically executes transmission and reception of messages with the message application 23.

Figure 18:
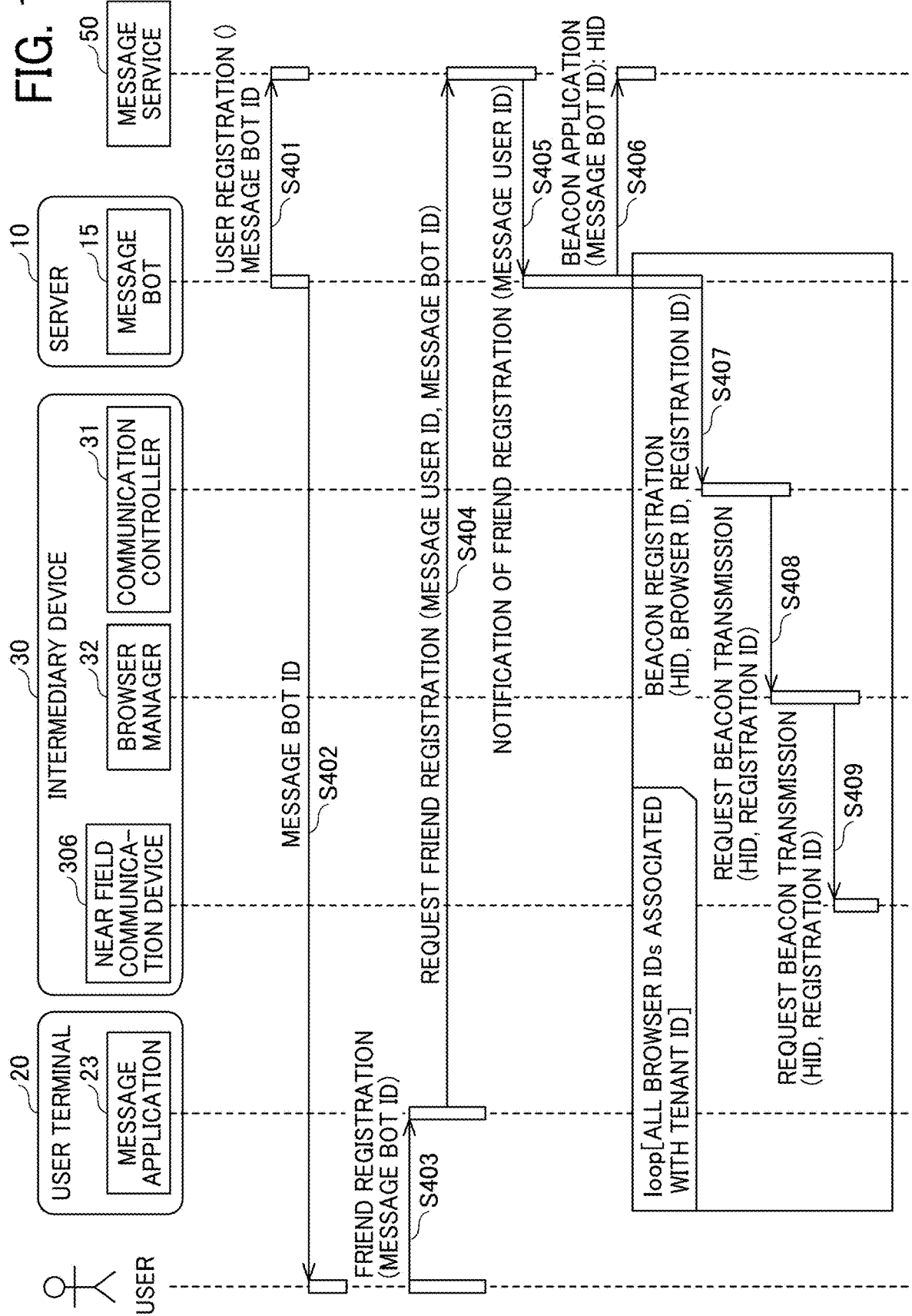
FIG. 18 is a sequence diagram for explaining an example of a process procedure of an advance preparation process in the second embodiment.

FIG. 18 is a sequence diagram for explaining an example of a process procedure of an advance preparation process in the second embodiment. In the second embodiment, the process procedure illustrated in FIG. 18 is performed as an advance preparation.

In step S401, the message bot 15 is registered as a user in the message service 50, and a user ID (hereinafter referred to as "message bot ID") is issued to the message bot 15.

Then, the message bot ID is notified to the user of the user terminal 20 (S402). For example, a mail, a QR code (registered trademark), or the like including the message bot ID is transmitted to the user terminal 20.

When the user inputs the notified message bot ID to the message application 23 of the user terminal 20 to instruct to register as a friend (S403), the message application 23 transmits, to the message service 50, a friend registration request including the user ID of the user related to the message application 23 (hereinafter referred to as "message user ID") and the input message bot ID (S404). The message application 23 can immediately receive the notification (message) from the message bot 15 by registering as a friend.

In response to reception of the friend registration request, the message service 50 notifies the message bot 15 related to the message bot ID included in the friend registration request that the user related to the message user ID included in the friend registration request has registered as a friend (S405).

Subsequently, in order for the message beacon to be transmitted from the intermediary device 30, the message bot 15 transmits a beacon application including the message bot ID to the message service 50, and receives, from the message service 50, issuance of a HardwareID (hereinafter referred to as "HID") to be included in the message beacon (S406).

Subsequently, the message bot 15 transmits a beacon registration request for transmitting the message beacon, to the communication controller 31 of the intermediary device 30 related to a tenant ID corresponding to the message user ID that has registered the message bot 15 as a friend (S407). The registration request includes the HID, a browser ID corresponding to the tenant ID, and a registration ID corresponding to the browser ID. The tenant ID corresponding to the message user ID can be identified with reference to the user information storage unit 123.

FIG. 19 is a diagram illustrating an example of a configuration of the user information storage unit 123 in the second embodiment. As illustrated in FIG. 19, in the second embodiment, the message user ID is associated with each set of the tenant ID and the user ID in the user information storage unit 123. Therefore, the message bot 15 can identify the tenant ID corresponding to the message user ID with reference to the user information storage unit 123.

In addition, the browser ID corresponding to the tenant ID can be identified with reference to the device information storage unit 122 (FIG. 8). Moreover, the registration ID corresponding to the browser ID can be identified with reference to the tag information storage unit 124 (FIG. 9).

Subsequently, in response to reception of the registration request, the communication controller 31 requests the browser manager 32 corresponding to the browser unit 33 related to the browser ID included in the registration request, to transmit a beacon including the target registration ID and the HID (S408). Subsequently, the browser manager 32 requests the near field communication device 306 to transmit the message beacon including the target registration ID and the HID (S409). As a result, the near field communication device 306 of the intermediary device 30 starts transmitting the message beacon including the target registration ID and the HID.

Figure 20B:
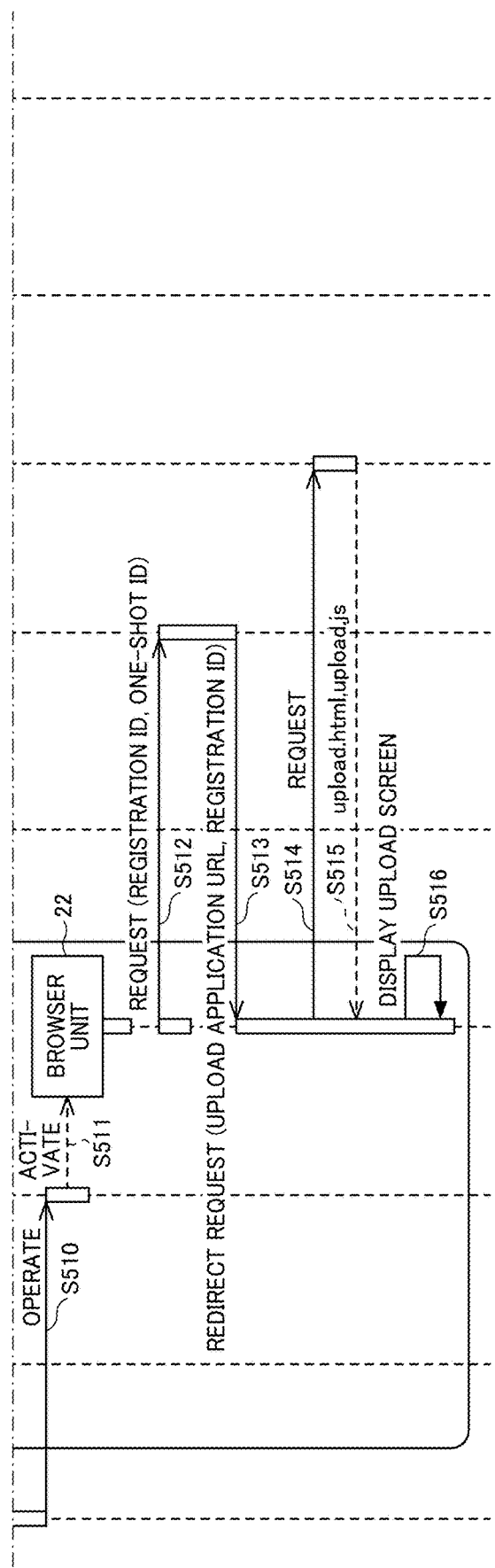

FIG. 20 is a sequence diagram for explaining an example of a process procedure executed in response to proximity of the user terminal 20 to a source of the message beacon. The process procedure of FIG. 7 is executed before execution of the process procedure of FIG. 20.

When the user brings the user terminal 20 close to the intermediary device 30 that is transmitting the message beacon (S501), the information acquirer 21 of the user terminal 20 receives the message beacon with the use of the near field communication device 206 (S502), and acquires the HID (hereinafter referred to as "target HID") and the registration ID (hereinafter referred to as "target registration ID") included in the message beacon (S503). That is, in the second embodiment, the near field communication device 206 is hardware capable of receiving a beacon based on BLE or the like transmitted by the near field communication device 306 of the intermediary device 30. In the present embodiment, it is assumed that a value of the target registration ID is "Tag 01".

Subsequently, the information acquirer 21 notifies the message application 23 of the user terminal 20 of the content (the target HID and the target registration ID) of the message beacon on the basis of a fact that a format of the message beacon corresponds to the message application 23 (S504). In response to the notification of the content of the message beacon, the message application 23 transmits, to the message service 50, a notification that the message beacon has been received (hereinafter, referred to as "beacon reception notification") (S505). In doing so, the message application 23 includes the message user ID of the user of the user terminal 20, the target HID and the target registration ID in the beacon reception notification.

The message service 50 transmits the beacon reception notification to the message bot 15 corresponding to the target HID (S506). That is, in the message service 50, the message bot 15 or the like that has received the issuance of the HID is managed in association with the HID. The beacon reception notification further includes a message ID for identifying the beacon reception notification. The message service 50 stores the content (message user ID, etc.) included in the beacon reception notification, in association with the message ID.

In response to reception of the beacon reception notification, the message bot 15 transmits, to the message service 50, a response to the beacon reception notification (S507). The response includes a one-shot ID and the initial access URL, in addition to the message ID and the target registration ID included in the beacon reception notification. The initial access URL is a URL for the application determiner 12 as described in the first embodiment. In the second embodiment, the initial access URL is set in advance in the message bot 15. In addition, the one-shot ID is identification information for limiting a period for login to the server 10 and is automatically generated by the message bot 15. For example, the one-shot ID may be a value based on a current date and time, or may be a value based on a date and time, or the like indicating a time limit for login. When the period for login to the server 10 is not limited, the one-shot ID may not be generated.

Subsequently, in response to the response from the message bot 15, the message service 50 transmits, to the message user ID stored in association with the message ID included in the response, a message including the content of the response from the message bot 15 (the initial access URL, the one-shot ID, the message user ID, the target registration ID, etc.) as a message from the message bot 15 (S508). For example, the message includes an operation button associated with a link of the initial access URL including the one-shot ID, the message user ID, and the target registration ID as option information.

In response to reception of the message, the message application 23 of the user terminal 20 of the user corresponding to the message user ID displays the message on the display 211 (S509). As a result, the user can confirm the message.

Subsequently, when the user presses the operation button included in the message (S510), the message application 23 automatically activates the browser unit 22 with the initial access URL indicated by the link associated with the operation button, as input information (S511). When the message application 23 includes a browser inside, the browser may be used as the browser unit 22.

In response to the activation, the browser unit 22 automatically transmits an HTTP request to the application determiner 12 corresponding to the initial access URL included in the input information (S512). The HTTP request includes option information (the one-shot ID, the message user ID, and the target registration ID) of the initial access URL.

In response to reception of the HTTP request, the application determiner 12 of the server 10 authenticates the message ID and the one-shot ID included in the HTTP request. For example, if the message user ID is stored as the message user ID of any user in the user information storage unit 123 (FIG. 19) and the one-shot ID has not expired, the authentication is successful, otherwise the authentication fails.

If the authentication is successful, processes similar to steps S206 to S209 in FIG. 11 are performed (S513 to S516).

As a result, the upload screen 510 (FIG. 13) is displayed on the display 211 of the user terminal 20.

Then, in accordance with capturing of image data by the user terminal 20, the process procedure described with reference to FIG. 14 is performed.

As described above, according to the second embodiment, the same effect as that of the first embodiment can be obtained without using the tag seal.

The server 10, the intermediary device 30, the output device such as the projector 40, the user terminal 20, and the message service 50 in the above embodiments may be constructed by a single computer or a plurality of computers to which respective units (functions or means) are divided and arbitrarily allocated.

In each of the above embodiments, the application determiner 12 is an example of the first receiving means. The upload application 13 is an example of second receiving means. The output application 14 and the distribution unit 11 are an example of transmitting means. The server 10 is an example of an information processing apparatus, which may be implemented by one or more computers.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device. The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cashe memory of the CPU, and the RAM may function as a physical memory or a primary memory of the apparatus, while the HDD may function as a secondary memory of the apparatus.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus communicable with a user terminal, the information processing apparatus comprising:
a storage configured to store, in association with each other, identification information identifying a service provided by the information processing apparatus, and information on an application that executes processing related to the service; and
processing circuitry configured to
receive identification information from the user terminal, the identification information having been obtained from an extraneous source by the user terminal;
determine an application, corresponding to the received identification information, based on the received identification information and the identification information stored in the storage;
transmit information for accessing the determined application to the user terminal;
receive a request from the user terminal based on the information for accessing the determined application; and
in response to the request, transmit, via execution of the determined application, a request for executing processing related to a particular service, wherein
the information on the application stored in the storage includes at least one of:
first information on a first application for uploading image data, and
second information on a second application for causing a device to execute output processing of the uploaded image data.

2. The information processing apparatus of claim 1, wherein the information on the application includes an identifier which identifies the application.

3. The information processing apparatus of claim 1, wherein the information for accessing the determined application includes a uniform resource locator (URL) of the application.

4. The information processing apparatus of claim 1, wherein the information for accessing the determined application includes information of a re-direct request transmitted from the information processing apparatus.

5. The information processing apparatus of claim 1, wherein the device is an output device.

6. The information processing apparatus of claim 5, wherein the second application causes the output device to execute the output processing via a relay device.

7. The information processing apparatus of claim 6, wherein
the processing circuitry is further configured to receive the image data from the user terminal and to transmit the image data to the relay device, and
the relay device causes the output device to execute the output processing based on the image data.

8. The information processing apparatus of claim 1, wherein the user terminal obtains the identification information by reading a code.

9. The information processing apparatus of claim 1, wherein in a case that the determined application is the first application, the request for executing processing includes instructions for the user terminal to execute the uploading of the image data.

10. An information processing method, comprising:
storing, in a storage of an information processing apparatus that is communicable with a user terminal, in association with each other, identification information identifying a service provided by the information processing apparatus, and information on an application that executes processing related to the service;
receiving, by processing circuitry of the information processing apparatus, identification information from the user terminal, the identification information having been obtained from an extraneous source by the user terminal;
determining, by the processing circuitry, an application corresponding to the received identification information, based on the received identification information and the identification information stored in the storage;
transmitting information for accessing the determined application to the user terminal;
receiving a request from the user terminal based on the information for accessing the determined application; and
in response to the request, transmitting, via execution of the determined application, a request for executing processing related to a particular service, wherein
the information on the application stored in the storage includes at least one of:
first information on a first application for uploading image data, and
second information on a second application for causing a device to execute output processing of the uploaded image data.

11. The information processing method of claim 10, wherein the information on the application includes an identifier which identifies the application.

12. The information processing method of claim 10, wherein the information for accessing the determined application includes a uniform resource locator (URL) of the application.

13. The information processing method of claim 10, wherein the information for accessing the determined application includes information of a re-direct request transmitted from the information processing apparatus.

14. The information processing method of claim 10, wherein the device is an output device.

15. The information processing method of claim 14, wherein the second application causes the output device to execute the output processing via a relay device.

16. The information processing method of claim 15, further comprising:
receiving the image data from the user terminal; and
transmitting the image data to the relay device, wherein
the relay device causes the output device to execute the output processing based on the image data.

17. The information processing method of claim 10, wherein the user terminal obtains the identification information by reading a code.

18. An information processing system, comprising:
a user terminal; and
an information processing apparatus communicable with the user terminal, the information processing apparatus including:
processing circuitry; and a storage configured to store, in association with each other, identification information identifying a service provided by the information processing apparatus, and information on an application that executes processing related to the service, wherein the processing circuitry is configured to receive identification information from the user terminal, the identification information having been obtained from an extraneous source by the user terminal;

determine an application, corresponding to the received identification information, based on the received identification information and the identification information stored in the storage;

transmit information for accessing the determined application to the user terminal;

receive a request from the user terminal based on the information for accessing the determined application; and in response to the request, transmit, via execution of the determined application, a request for executing processing related to a particular service, wherein the information on the application stored in the storage includes at least one of:

first information on a first application for uploading image data, and second information on a second application for causing a device to execute output processing of the uploaded image data.

* * * * *